US005557553A

United States Patent [19]

Sellie, Sr.

[11] Patent Number: 5,557,553

[45] Date of Patent: Sep. 17, 1996

[54] COMPUTER ASSISTED TIME STUDY SYSTEM

[76] Inventor: Clifford N. Sellie, Sr., 320 Sunset Ct., Northbrook, Ill. 60062-5635

[21] Appl. No.: 152,212

[22] Filed: Nov. 12, 1993

[51] Int. Cl.[6] .................. G06F 15/22

[52] U.S. Cl. .................. 364/569; 364/401 R; 364/411; 364/424.04

[58] Field of Search .................. 364/406, 401, 364/569, 411, 424, 424.01–424.04; 340/309.15

[56] References Cited

U.S. PATENT DOCUMENTS

| | | | |
|---|---|---|---|
| 5,068,787 | 11/1991 | Pipella et al. | 364/406 OR |
| 5,212,635 | 5/1993 | Ferriter | 340/309.15 OR |
| 5,267,147 | 11/1993 | Harshaw et al. | 364/401 |

*Primary Examiner*—Emanuel T. Voeltz
*Assistant Examiner*—Kamini Shah
*Attorney, Agent, or Firm*—Thomas R. Vigil

[57] ABSTRACT

The computer assisted time study system is used for establishing standard time values for workers at a company and comprises a hand holding data accumulating device including a hand holdable housing, electronic circuitry including a microcomputer in the hand holdable housing and including an on-board memory and a clipboard mounted on top of the housing and having clip for releasable securing a time study sheet of form on the clipboard. Data acquisition software and initial processing software are stored in the on-board memory of the microcomputer. The data accumulating device also includes manually actuated push button/keys for identifying elements for a time study, a visual display for indicating the number corresponding to the push button/key actuated, and calculating circuitry responsive to manual manipulation of button/keys of the device for producing on the visual display an indication of a relationship between a previously entered standard time identification and a later entered actual time identification. The system further includes a personal or host computer including a memory, data processing software stored in the memory of the personal or host computer for further processing the data accumulated and initially processes that had been stored in, and that is subsequently downloaded from, the on-board memory in the personal or host computer and a printer for printing further processed data.

22 Claims, 29 Drawing Sheets

FIG. 25A

```
                       TIME STUDY OBSERVATIONS   -   BASIC

------------------------------------------------------------------ ======= ======= =======
  Type   O = Operator Controlled      Total Actual Time:     0.061   0.055
   of    M = Machine Controlled
Element  I = Internal                 Total Leveled Time:     0.056   0.055   0.056
==========================================================================================

      PFD ALLOWANCES:                        MANUAL Leveled Time          0.025
                                               Plus 15 % MANUAL PFD       0.004
          15 % Manual                        MACHINE Time                 0.019
          10 % Machine                        Plus 10 % MACHINE PFD       0.002
                                                                          -------
      OTHER ALLOWANCES:
                                        Total MANUAL and MACHINE Time     0.050

          20 % Incentive
               % Daywork                             Less INTERNAL Time   0.011
                                                                          -------
      Std. Hrs./100:      0.078           Net MANUAL and MACHINE Time     0.039
                                                                          =======
      Std.Pcs./Hrs.:      1277                   Plus 20 %  ALLOWANCE     0.008

                                                       STANDARD TIME      0.047
```

FIG. 25B

APPROVED BY: Arthur Smith DATE: 01/16/92

COMMENTS

WORK PLACE SKETCH

FIG. 26A

```
                TIME STUDY OBSERVATIONS   -   BASIC

=================================================================================
PART NO. : PART NAME        : OPERATION NO.: OPERATION NAME
B 118    : Bearing Cap      : 2 osp        : Spotface (2) 1 3/16 Holes
---------------------------------------------------------------------------------
W.C. NO. : WORK CENTER NAME : DEPT. NO.    : DEPARTMENT NAME   : LOCATION
4        : Cinn. Drill Press: 22           : Machine           : Chicago Facilities
---------------------------------------------------------------------------------
T.S. NO. : T.S. DATE        : OPERATOR NO. : OPERATOR NAME     : T.S. ANALYST
       10: 01/15/92         : 150          : Frank H.          : JNT
---------------------------------------------------------------------------------
         : DATE ISSUED      :              : DATE EFFECTIVE    :
         : 01/18/92         :              : 01/21/92          :
=================================================================================
```

FIG. 26B

0------------------------------ Cycles ------------------------------0 - DECIMAL MINUTES -

| # | Freq | T | 1 | 2 | 3 | 4 | 5 | 6 | 7 | 8 | 9 | 10 | :Obs Use | Mean | Medn. | Selct |
|---|---|---|---|---|---|---|---|---|---|---|---|---|---|---|---|---|
| 1 | | | Grasp part and move under the spindle | | | | | | | | | | | | | |
| | 1 | O | 0.020 | 0.030 | 0.020 | 0.020 | 0.040 | 0.030 | 0.020 | 0.020 | 0.025 | 0.020 | 10 | 0.025 | 0.020 | |
| | | | 100 | 80 | 100 | 100 | 80 | 90 | 100 | 100 | 90 | 100 | | | | |
| | | | 0.020 | 0.024 | 0.020 | 0.020 | 0.032 | 0.027 | 0.020 | 0.020 | 0.020 | 0.020 | | 0.022 | 0.020 | 0.021 |
| 2 | | | Lower spindle four inches | | | | | | | | | | | | | |
| | 1 | M | 0.020 | 0.030 | 0.020 | 0.020 | 0.020 | 0.020 | 0.020 | 0.020 | 0.015 | 0.015 | 10 | 0.020 | 0.020 | |
| | | | 100 | 80 | 100 | 100 | 80 | 90 | 100 | 100 | 90 | 100 | | | | |
| | | | 0.020 | 0.024 | 0.020 | 0.020 | 0.016 | 0.018 | 0.020 | 0.020 | 0.015 | 0.015 | | 0.019 | 0.020 | 0.019 |
| 3 | | | Set aside the finished part | | | | | | | | | | | | | |
| | 1 | I | 0.016 | 0.011 | 0.010 | 0.013 | 0.011 | 0.013 | 0.011 | 0.011 | 0.011 | 0.013 | 10 | 0.012 | 0.011 | |
| | | | 80 | 100 | 100 | 100 | 80 | 90 | 100 | 100 | 100 | 90 | | | | |
| | | | 0.013 | 0.011 | 0.010 | 0.013 | 0.009 | 0.012 | 0.011 | 0.011 | 0.011 | 0.012 | | 0.011 | 0.011 | 0.011 |
| 4 | | | Consult with supervisor re: material quality | | | | | | | | | | | | | |
| | 1/500 | 0 | | | | | 2.000 | | | | | | 1 | 0.004 | 0.004 | |
| | | | | | | | 100 | | | | | | | | | |
| | | | | | | | 2.000 | | | | | | | 0.004 | 0.004 | 0.004 |

COMPUTER ASSISTED TIME STUDY SYSTEM

BACKGROUND OF THE INVENTION

1. Field of the Invention

The present invention relates to a computer assisted time study system including a data accumulating unit or device which is utilized in the studies of motions of a subject, worker or operator to determine the amount of time required for or spent in individual motions in performing an operation, and the total time in all of the motions, which are of importance in the productivity of the particular operation.

2. Description of the Related Art Including Information Disclosed Under 37 CFR §§1.97–1.99

In the field of industrial engineering, time studies are conducted for establishing an allowed time standard for performing a given task based on measurement of the work content of prescribed method with due allowance for fatigue and for personal and unavoidable delays.

Standard times facilitate methods engineering and facilitate the development of accurate cost determinations in advance of production.

In conducting a time study, the time recording equipment used today generally fall into the following five classifications:

1. Decimal minute stop watches;
2. Decimal hour stop watches;
3. Data collecting machines;
4. Video tape equipment; and
5. Motion picture camera.

As will be described in greater detail hereinafter, the computer assisted time study system of the present invention utilizes a data accumulating unit (falling in classification 3) constructed according to the teachings of the present invention and a personal computer into which data accumulated and initially processed with an accumulation program of the present invention stored in a microcomputer in the data accumulating device is processed by a processing program of the invention stored in the personal computer.

As will be apparent from the following description, the computer assisted time study system, including the data accumulating device, the program for accumulating and initially processing the data, and the data processing program provide advantages over previously proposed data collection machines, one of which is sold under the tradename DataMyte 1000.

Further background information regarding the development of, the taking of, and processing of, and the use of time studies can be found in the *HANDBOOK OF INDUSTRIAL ENGINEERING,* second edition, edited by Gabriel Salvendy, published in cooperation with the Institute of Industrial Engineers by John Wiley & Sons, Inc., New York, N.Y., 1992, and *ENGINEERED WORK MEASUREMENT,* by Delmar W. Carter and Franklin H. Bayha, published by Industrial Press, Inc., New York, N.Y.

SUMMARY OF THE INVENTION

The computer assisted time study system includes a data accumulating unit or device comprising a body with a hand held board mounted thereon and on which there is placed a record sheet for recording the results of the observations by the user of a worker performing a particular repetitive task. Electrical and electronic components of the device are mounted in the body.

According to the present invention there is provided a computer assisted time study system comprising: a data accumulating device including a body, electronic circuitry including a microcomputer located in the body and a clipboard mounted on top of the body for receiving a time study sheet or form; data acquisition and initial processing software stored in a memory of the microcomputer; a personal computer; and, data processing software stored in the personal computer into which data is downloaded from the memory in the microcomputer in the data acquisition device.

One principal feature of the system and device is that the user or observer is able to manipulate the device manually, while directly observing the worker or operator and his movements. The timing of the intervals, in which the movements occur, are presented on a visual display.

An additional feature is that a record sheet of standard form, can be applied to or mounted on the board for facilitating marking therein of the results observed and, since the record sheet is of standard form, the results are easily recorded by the observer and easily understood by others who read the resulting record sheet.

Still another feature resides in the compact arrangement of various elements making up the device and the simple and easy manipulation of the electronic components.

A further feature resides in the fact that the device of the system includes a main component that can be easily held and manipulated, manually, and the observer can concentrate more fully on the motion of the operator, with resulting greater accuracy.

Still another feature and great advantage is that the system and device incorporate elements and components that are in themselves standard, and known, including time study forms, electrical circuitry, computers and some known software. Also the system uses professionally recommended time study forms, rating practices, and histograms and records. A primary advantage of the system and device is that the system and the device utilize standard components and ties them together in a combined package that simplifies the usage of the device and system and offers an easily followed "road map" so that both the amateur and the professional can readily perform professional caliber time studies within a minimum time frame. The system is designed to lead the user through the correct sequence of actions required to perform a competent time study.

Other features and advantages of the system and the device will be referred to in the detailed description hereinbelow, in which, because of direct reference to the various elements of the device of the system, will render those features and advantages more readily understood and appreciated.

BRIEF DESCRIPTION OF THE DRAWINGS

FIGS. 25A and 25B show one printout of the time study observations generated by the personal computer utilizing the program illustrated by the flow charts illustrated in FIGS. 13–22.

FIGS. 26A and 26B show another printout of the time study observations generated by the personal computer utilizing the program illustrated by the flow charts illustrated in FIGS. 13–22.

DESCRIPTION OF THE PREFERRED EMBODIMENT

Figure 2:
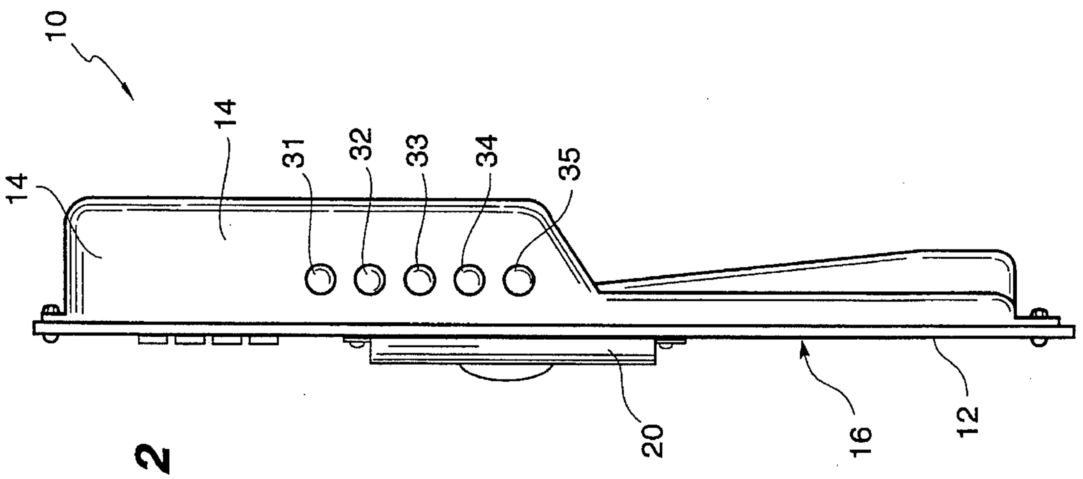
FIG. 2 is a side elevational view of the device shown in FIG. 1 and is taken along line 2—2 of FIG. 1.
Figure 1:
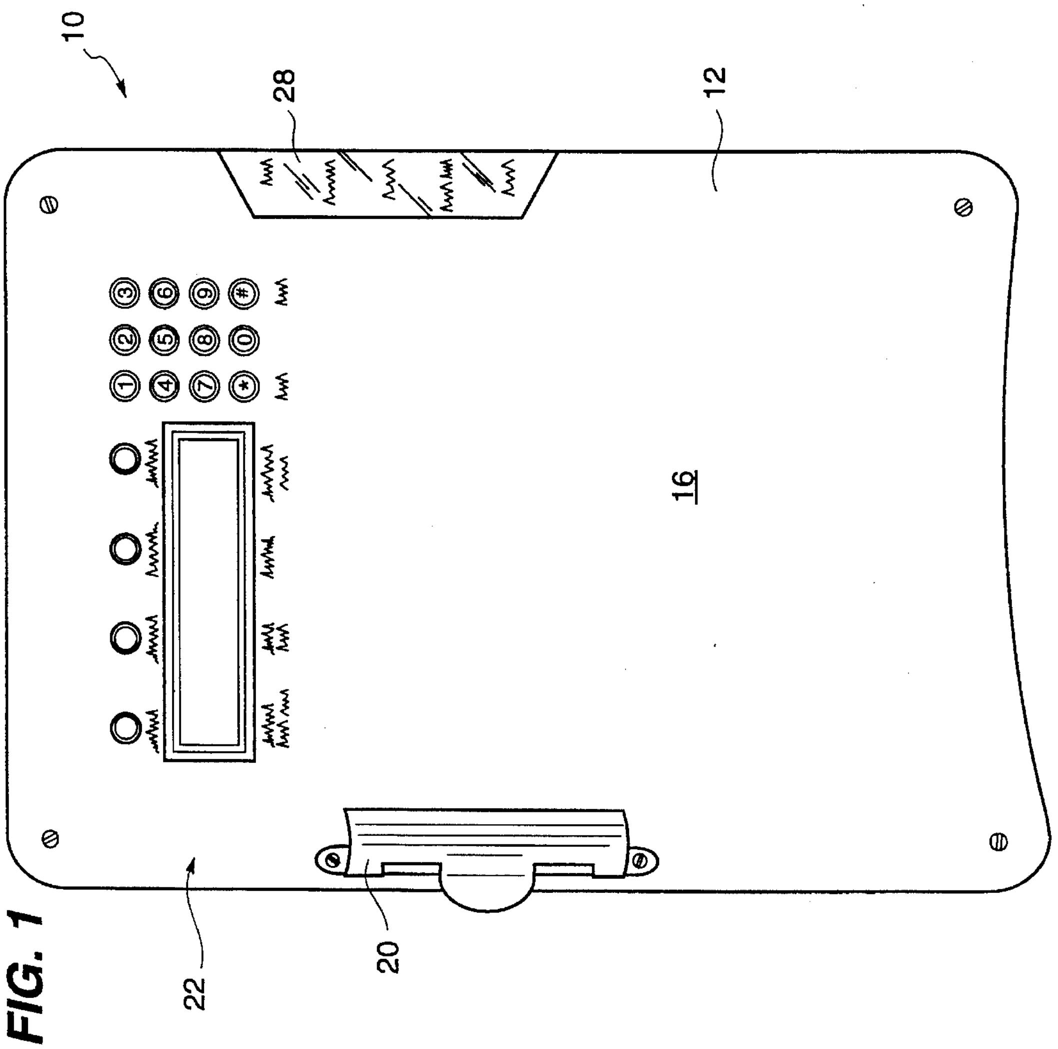
FIG. 1 is a plan view of a data accumulating unit or device constructed according to the teachings of the present invention and utilized in the computer assisted time study of the present invention.
Figure 3:
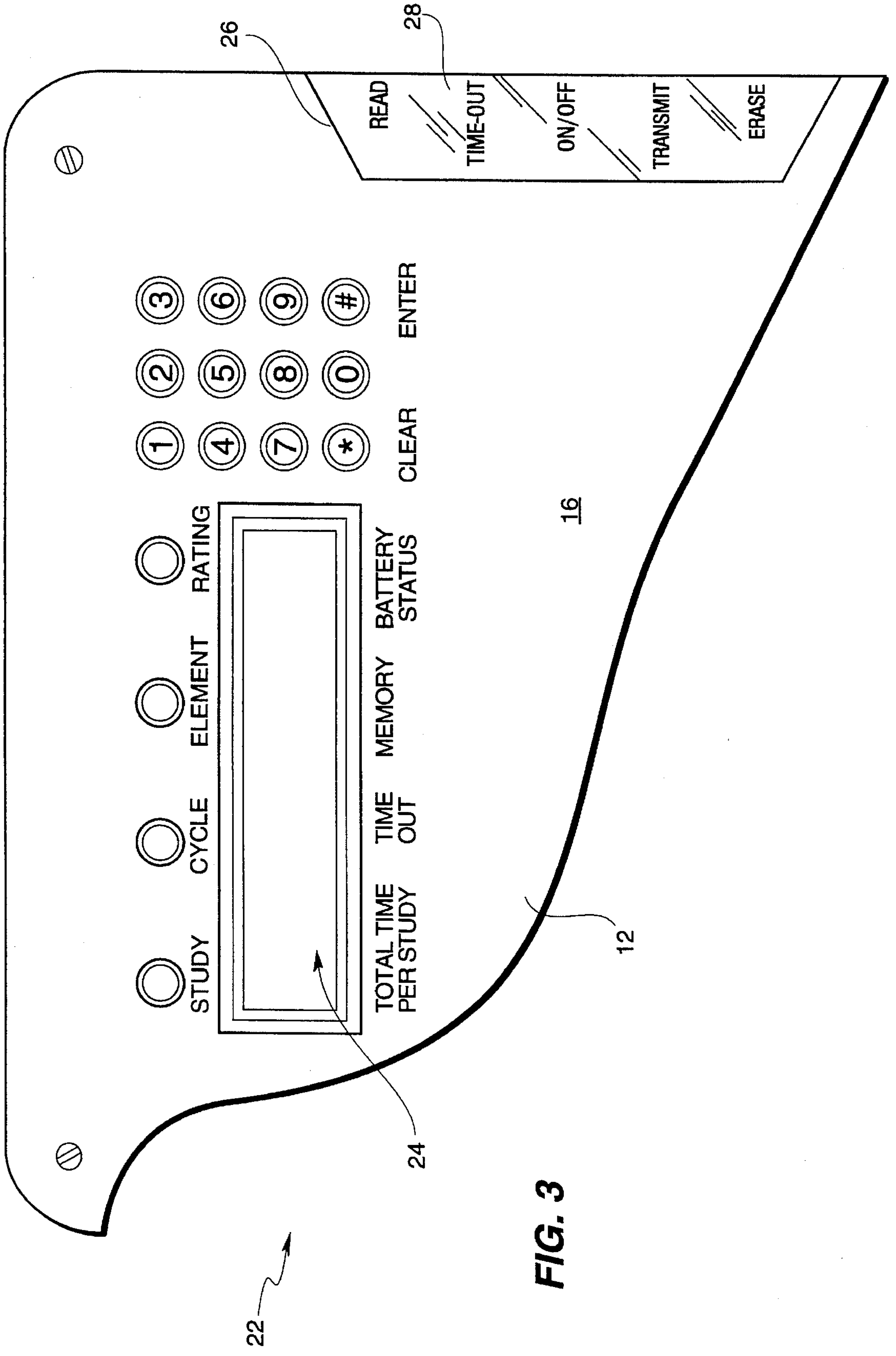
FIG. 3 is an enlarged view of the upper portion of a clipboard of the unit shown in FIG. 1 with portions broken away.
Figure 4:
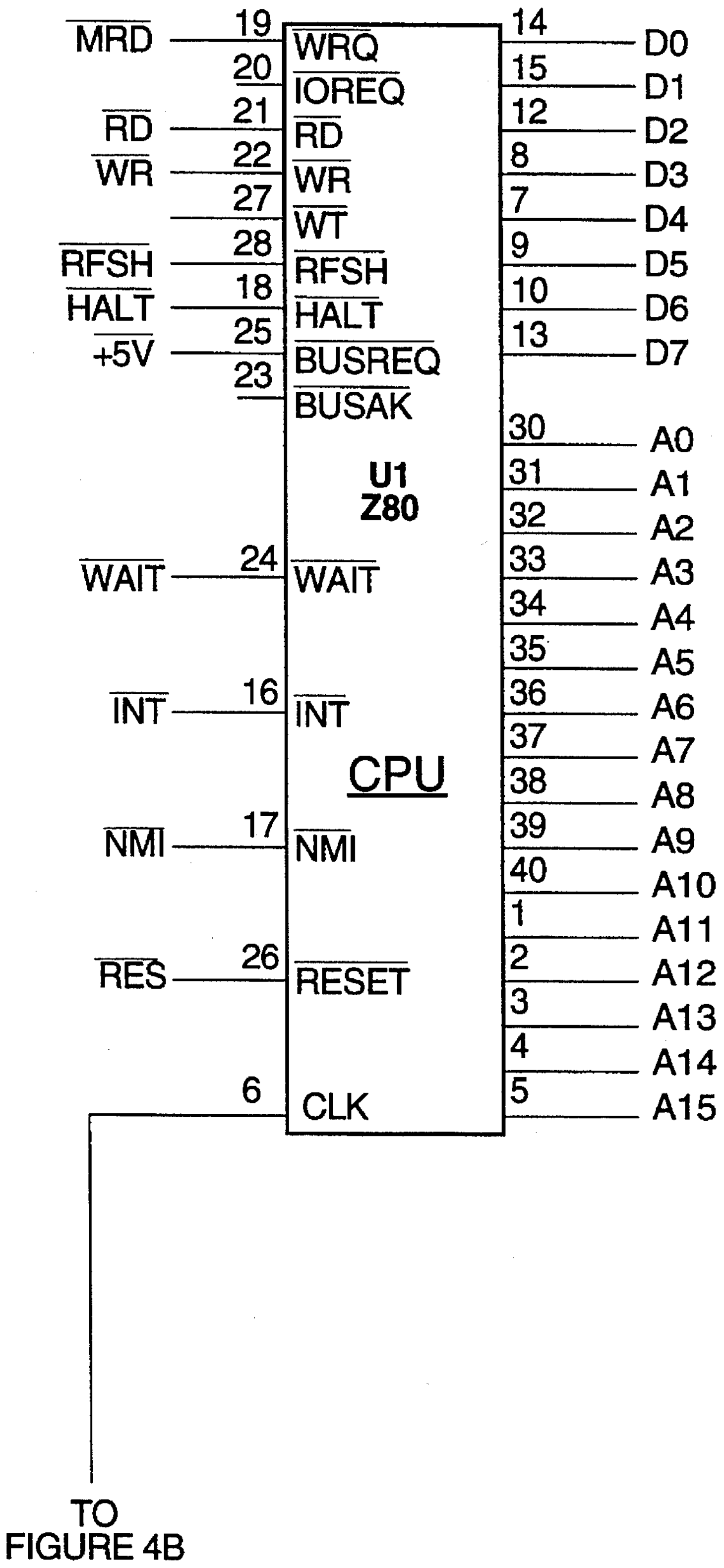
FIGS. 4, 4A and 4B show a block electrical circuit diagram of the microcomputer contained within the data accumulating device and shows a microprocessor and associated circuit elements, including a RAM, a ROM, buffer circuits, latch circuit, and clock and oscillator circuit.
Figure 4A:
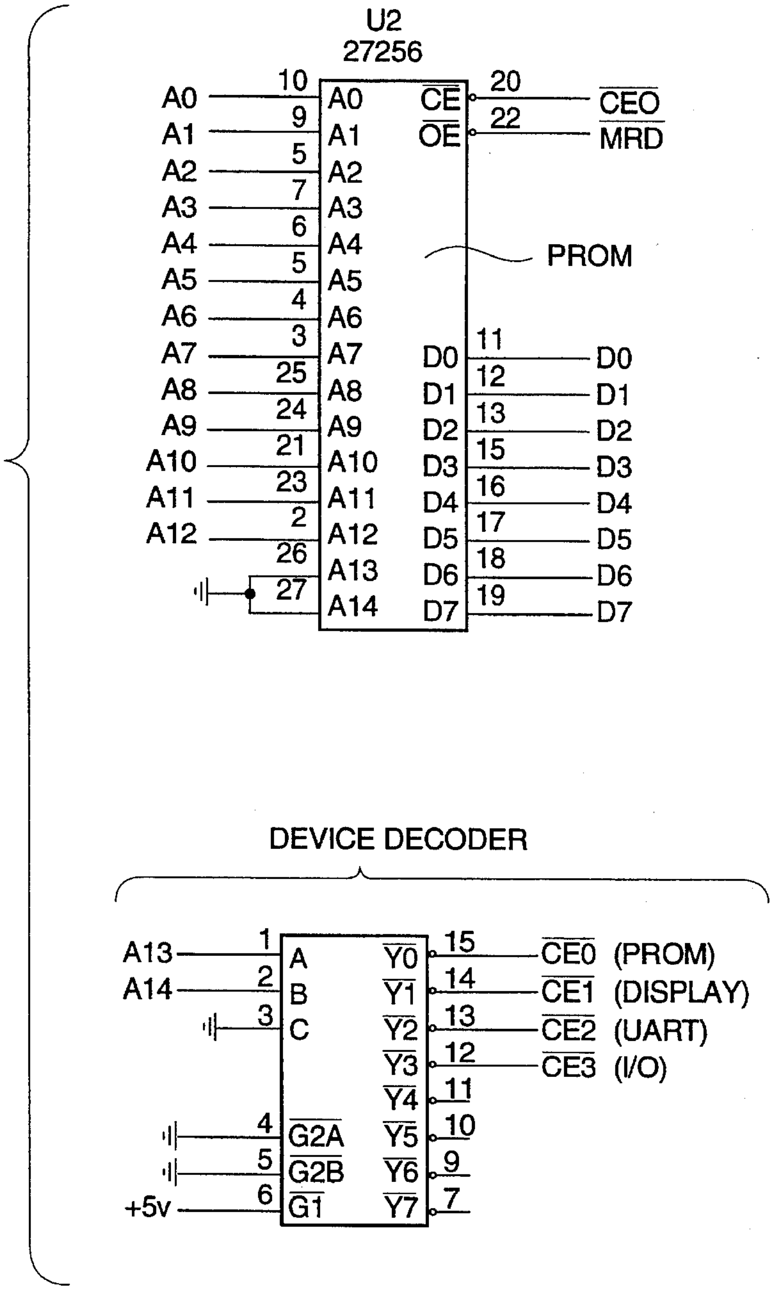
Figure 5A:
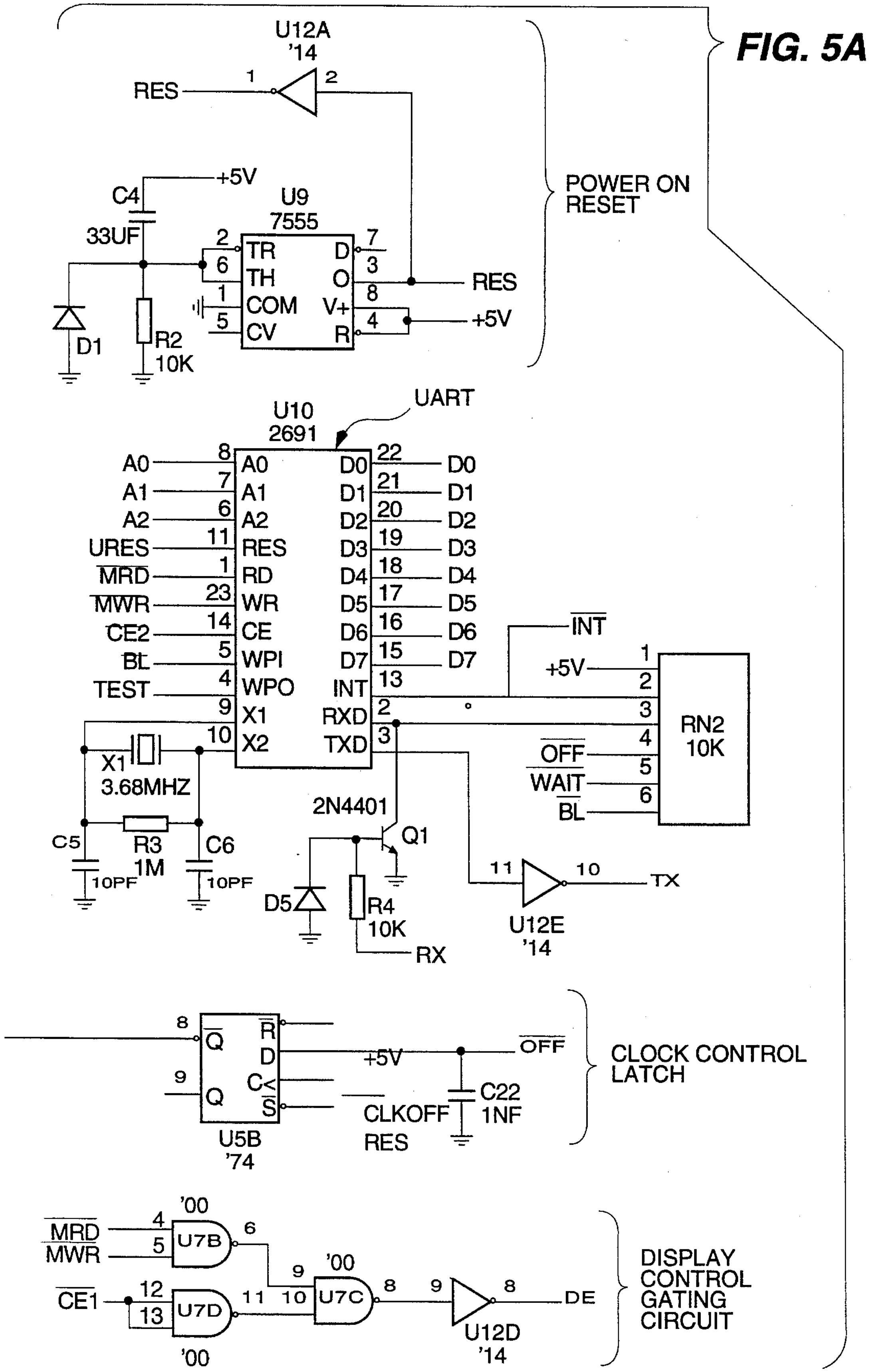
FIGS. 5A and 5B show a block electrical circuit diagram of a universal asynchronous receiver/transmitter circuit and associated RAM, resistor networks, logic, latch and buffer circuit elements.
Figure 5B:
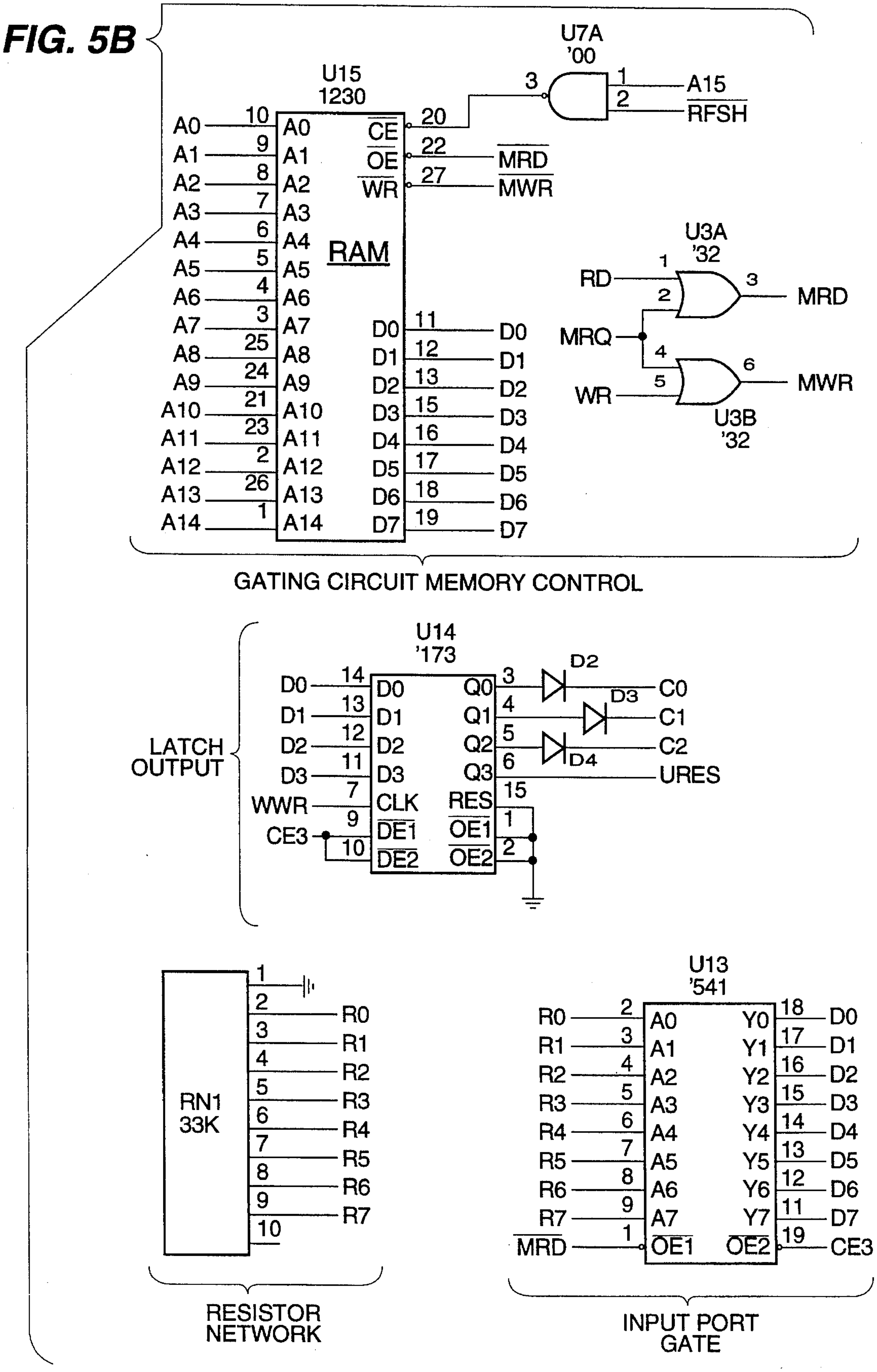
Figure 6:
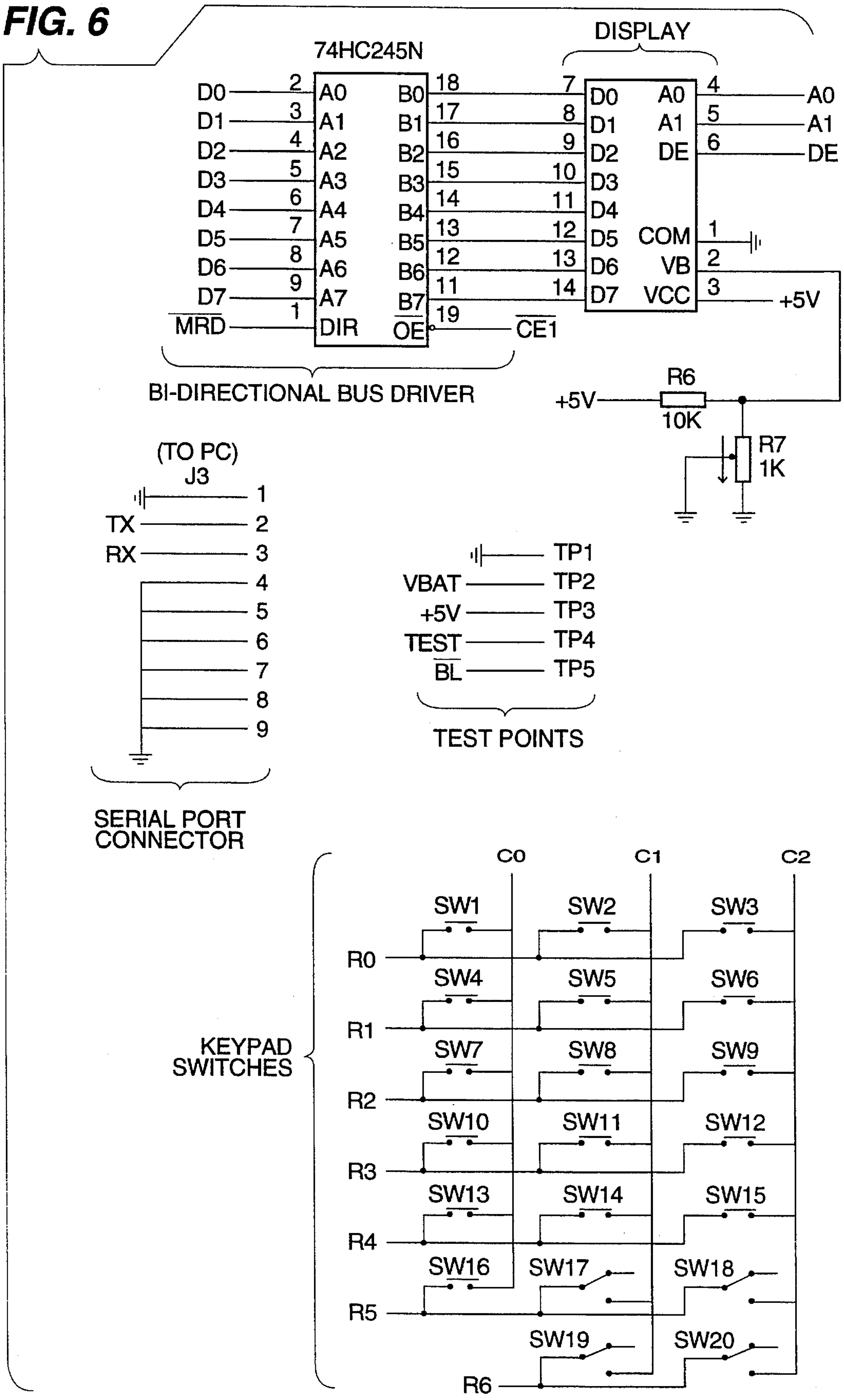
FIG. 6 is a block electric circuit diagram of latch and buffer circuits and the keyboard circuit.
Figure 8:
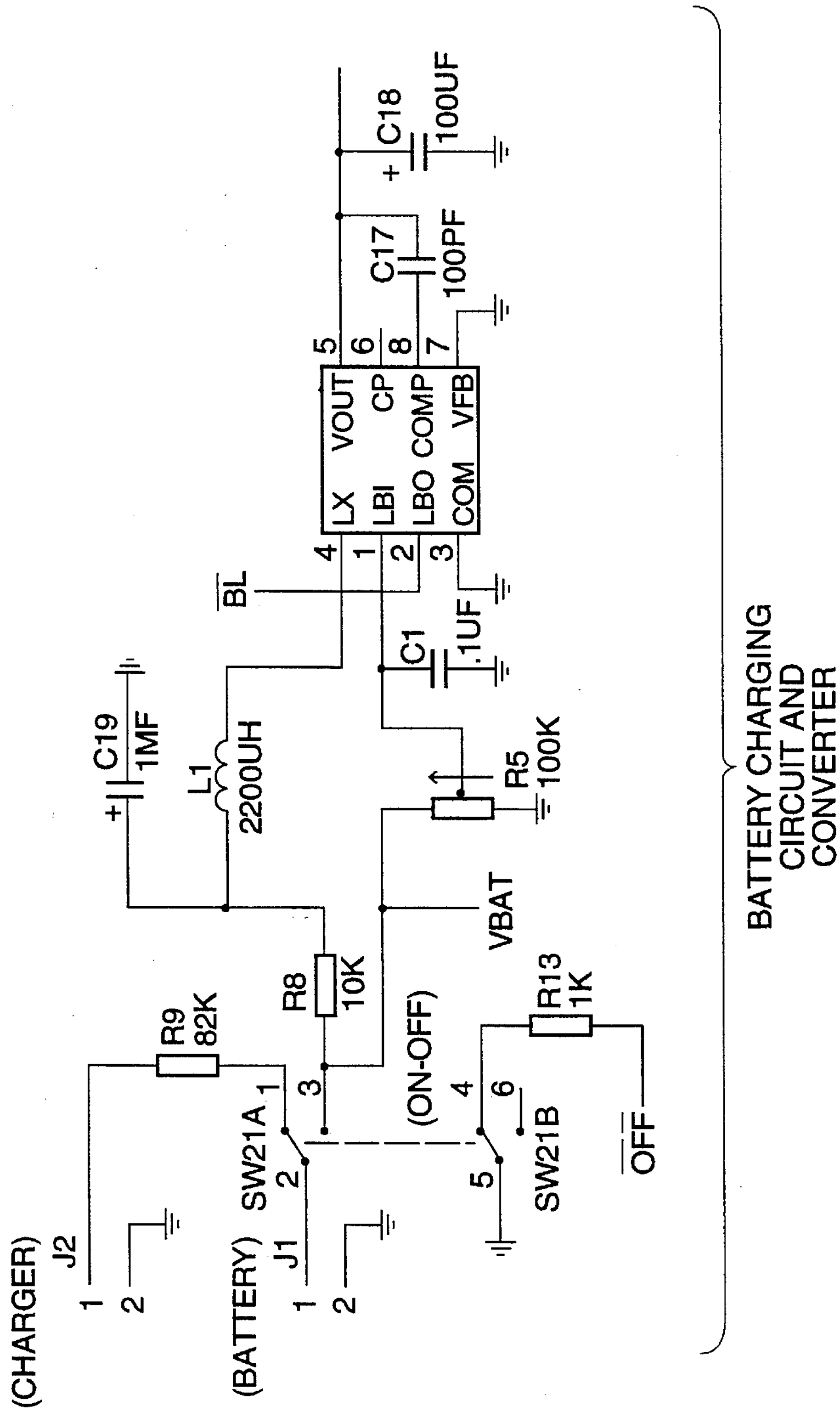
FIG. 8 is a block electrical circuit diagram of a power supply circuit for the device.
Figure 9:
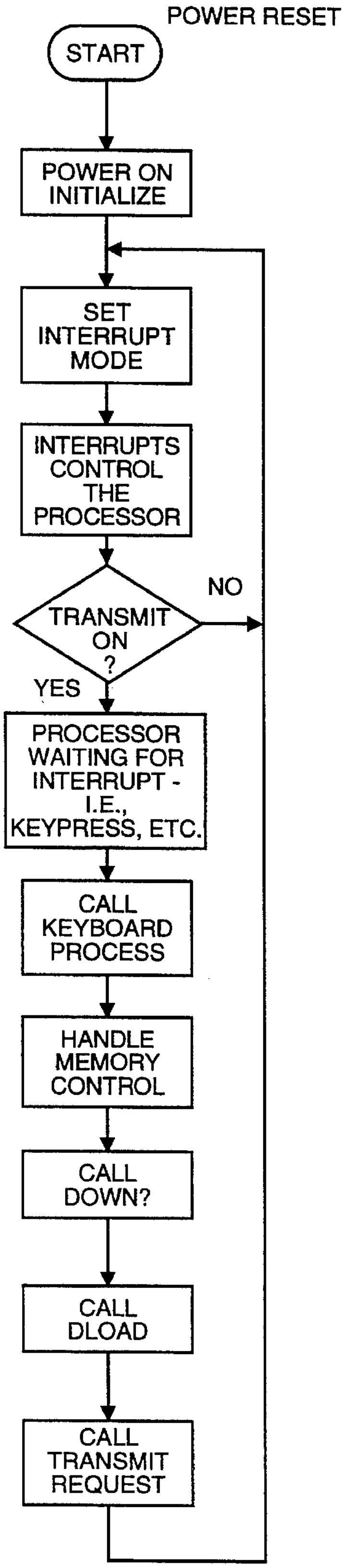
FIG. 9 is a flow chart of a power reset program.
Figure 10:
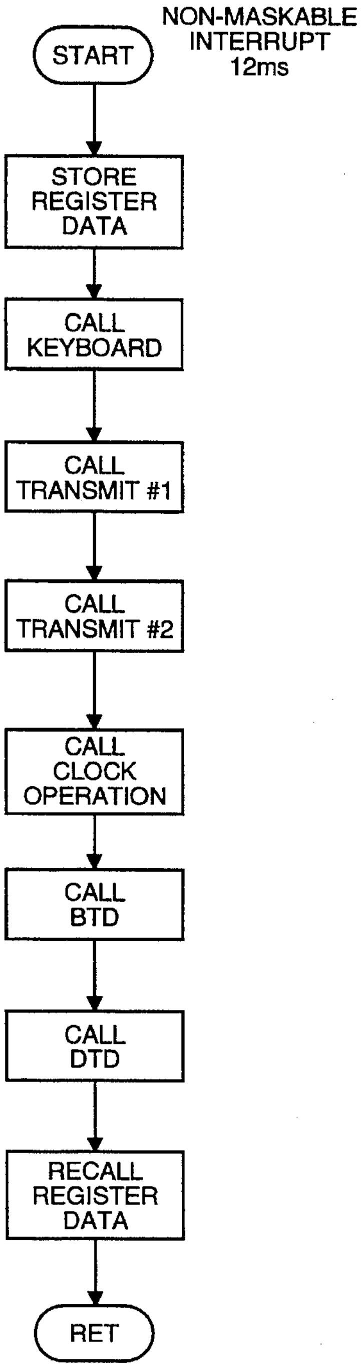
FIG. 10 is a flow chart of non-maskable interrupt program.
Figure 11A:
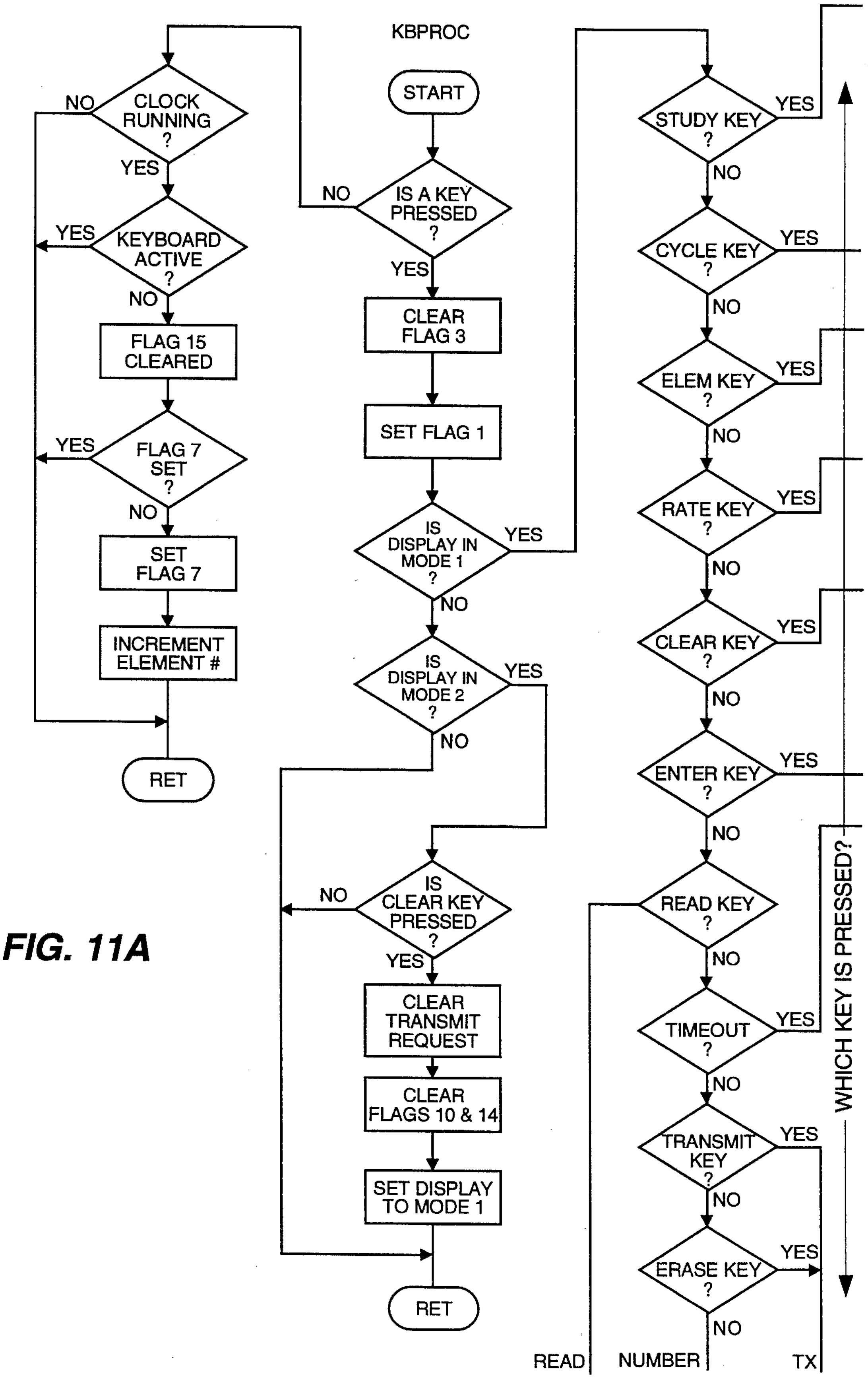
FIGS. 11A–11C show the flow chart for a keyboard processing program.
Figure 11B:
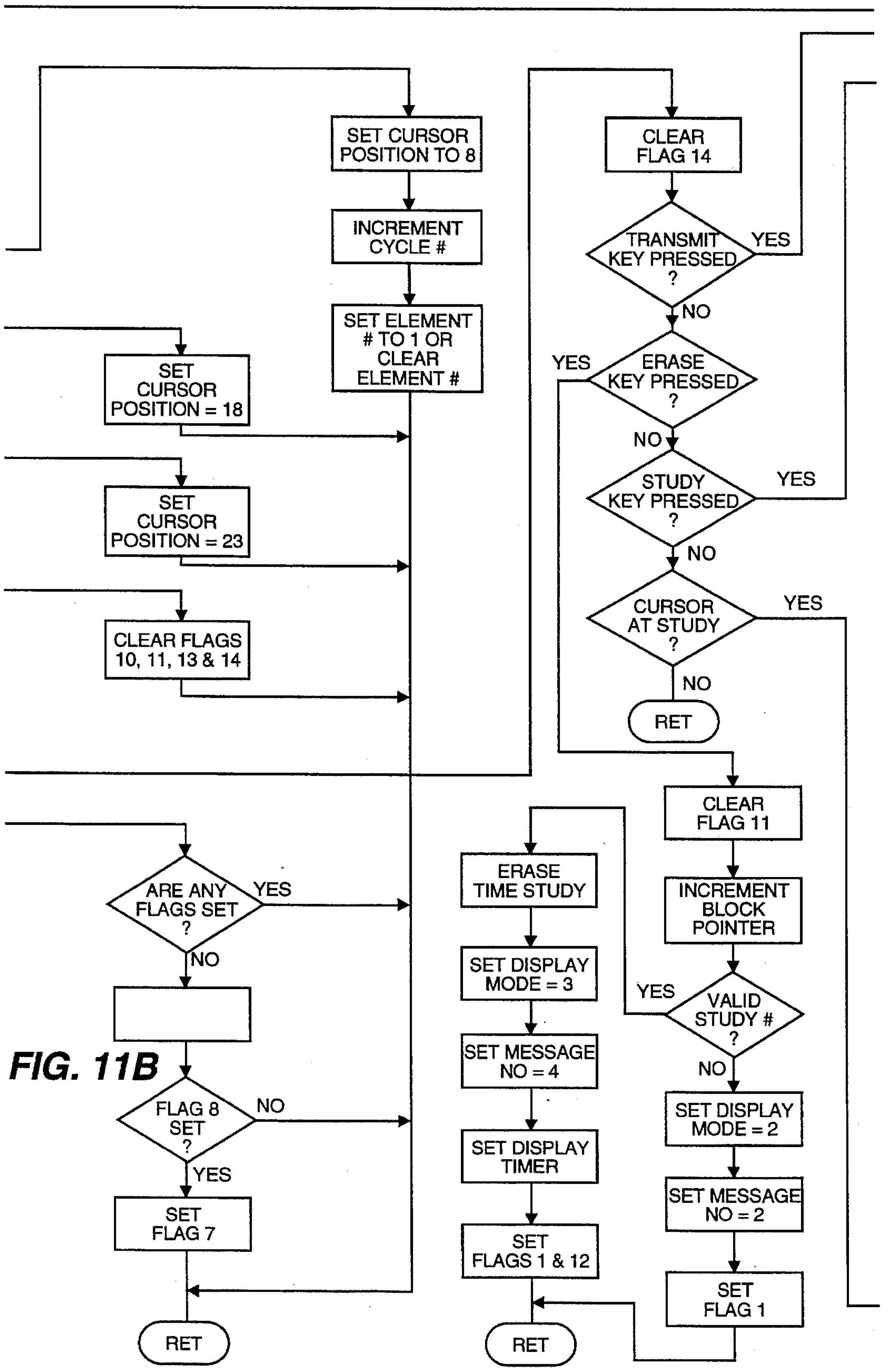
Figure 11C:
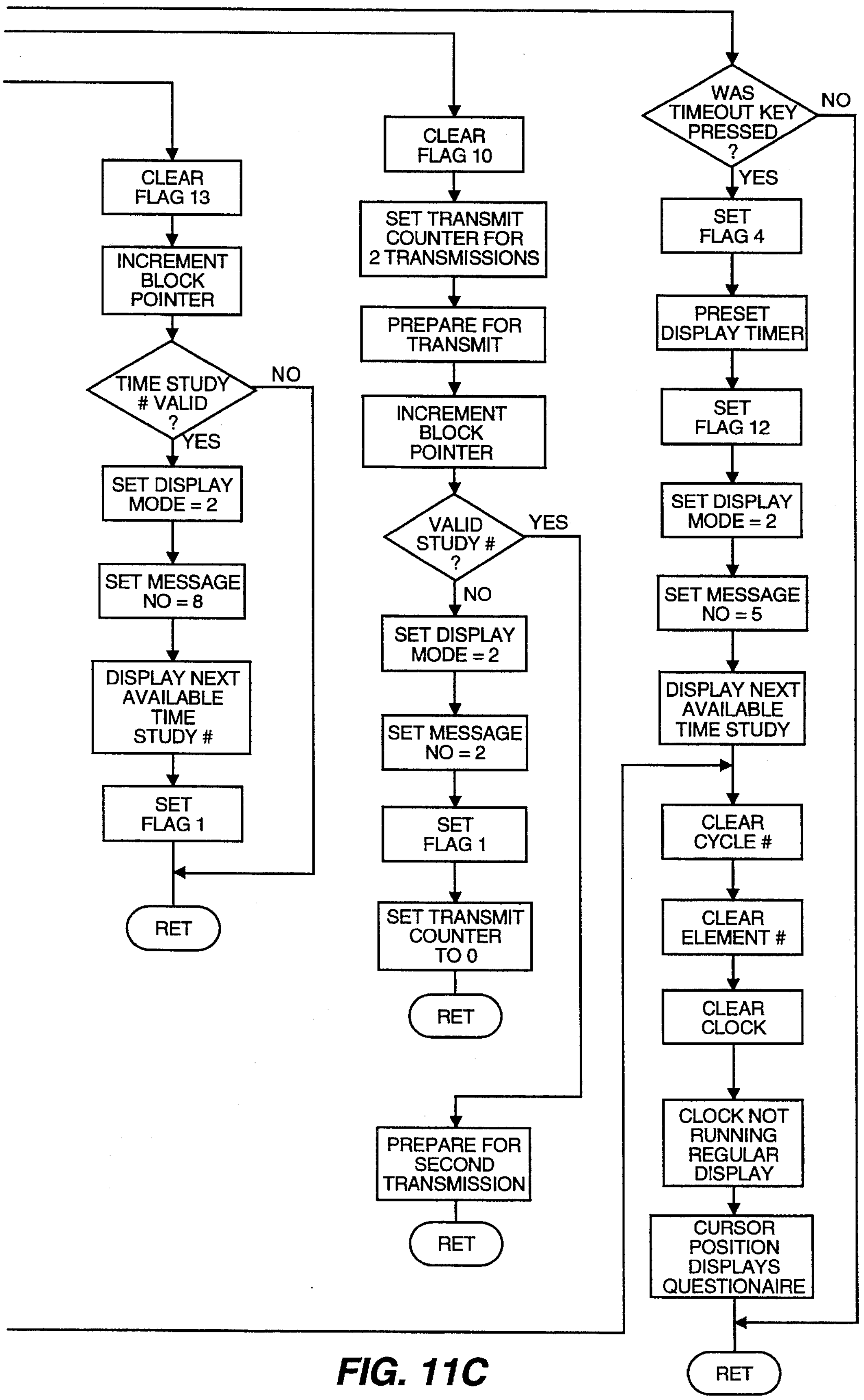
Figure 12:
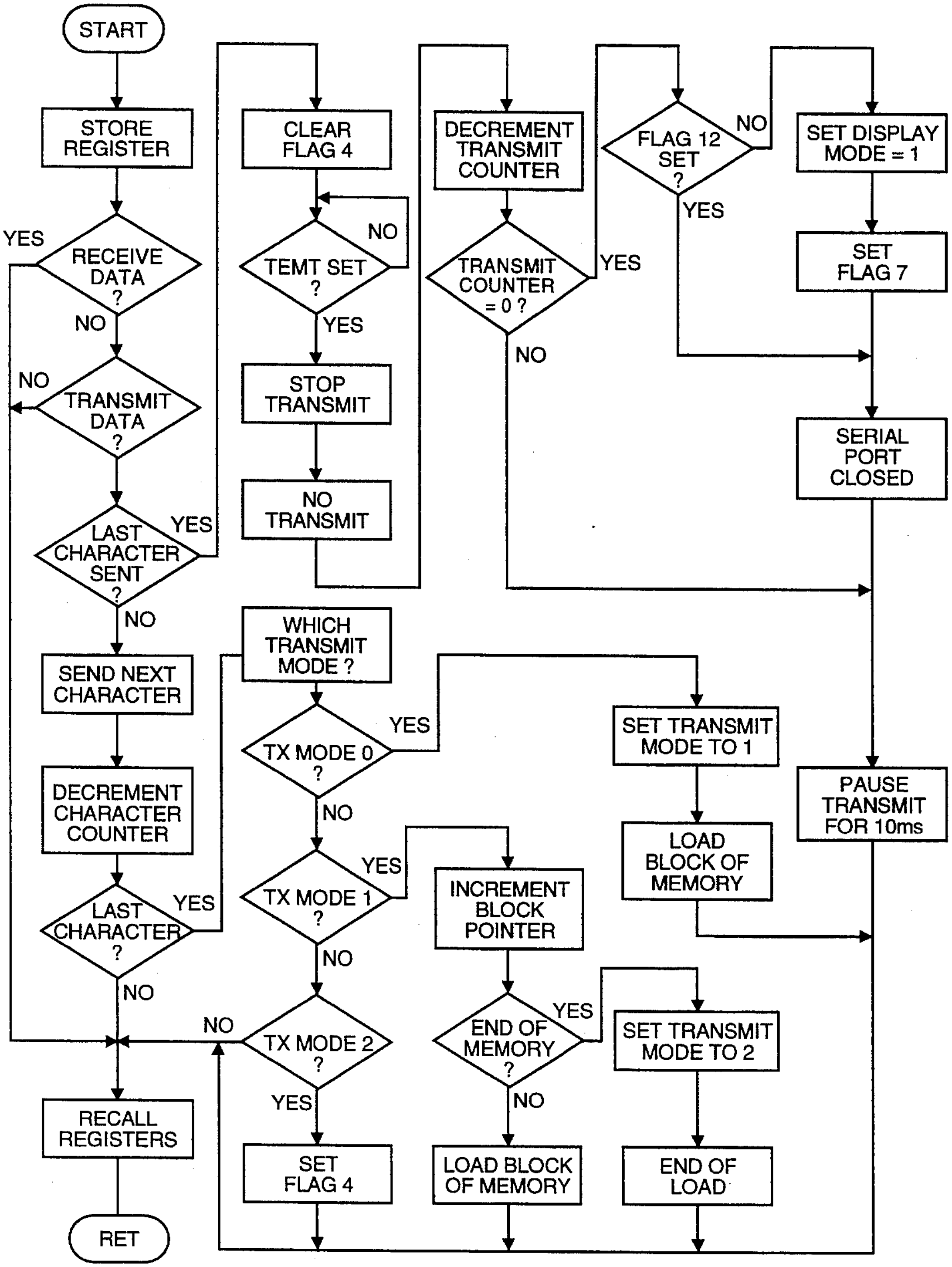
FIG. 12 is a flow chart of a transmit program carried out by the universal asynchronous receiver transmitter illustrated in FIG. 5.
Figure 13:
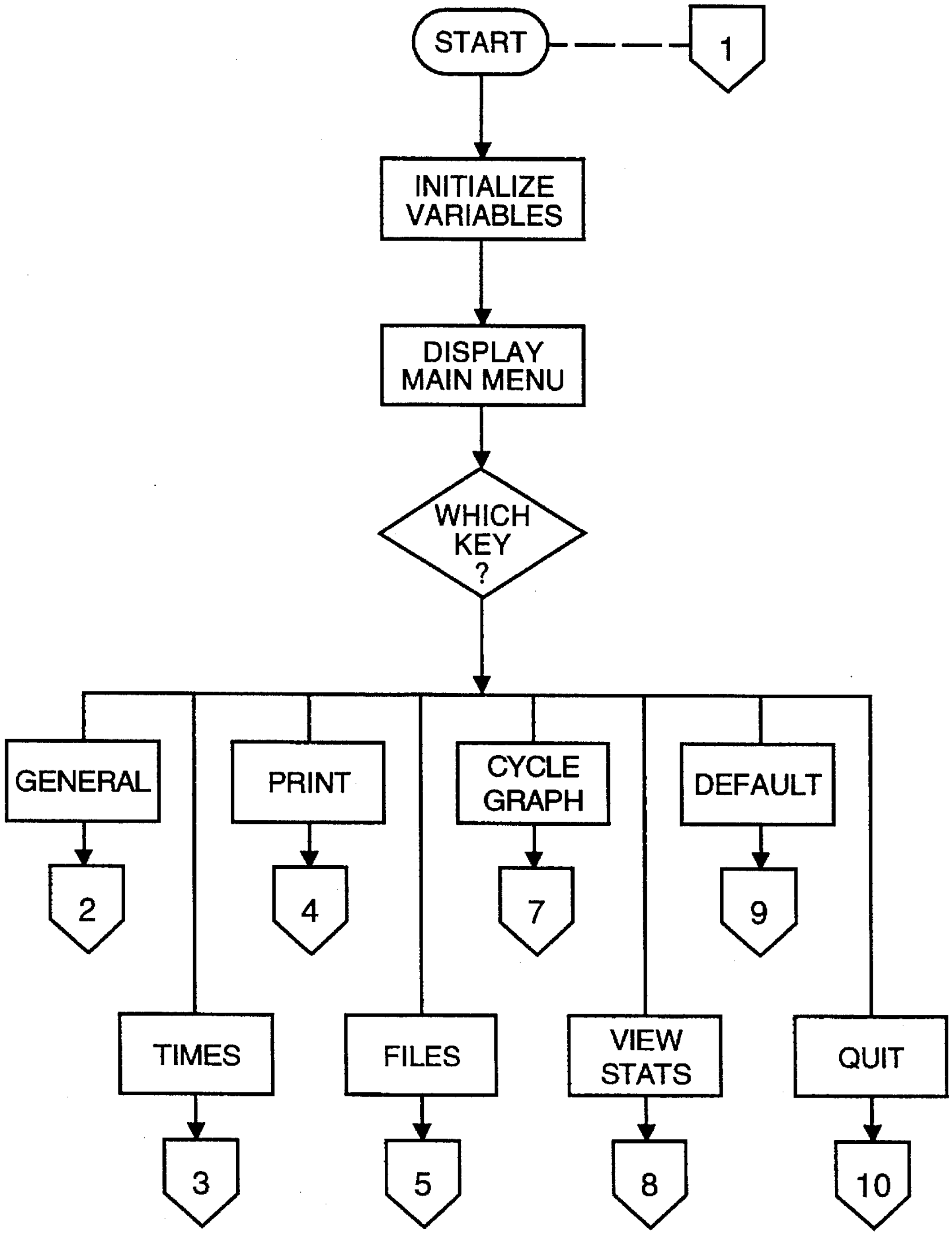
FIGS. 13–22 show the flow chart of the program/routine and subroutines carried out in a personal computer in processing the data downloaded thereto from the data accumulating device.
Figure 14:
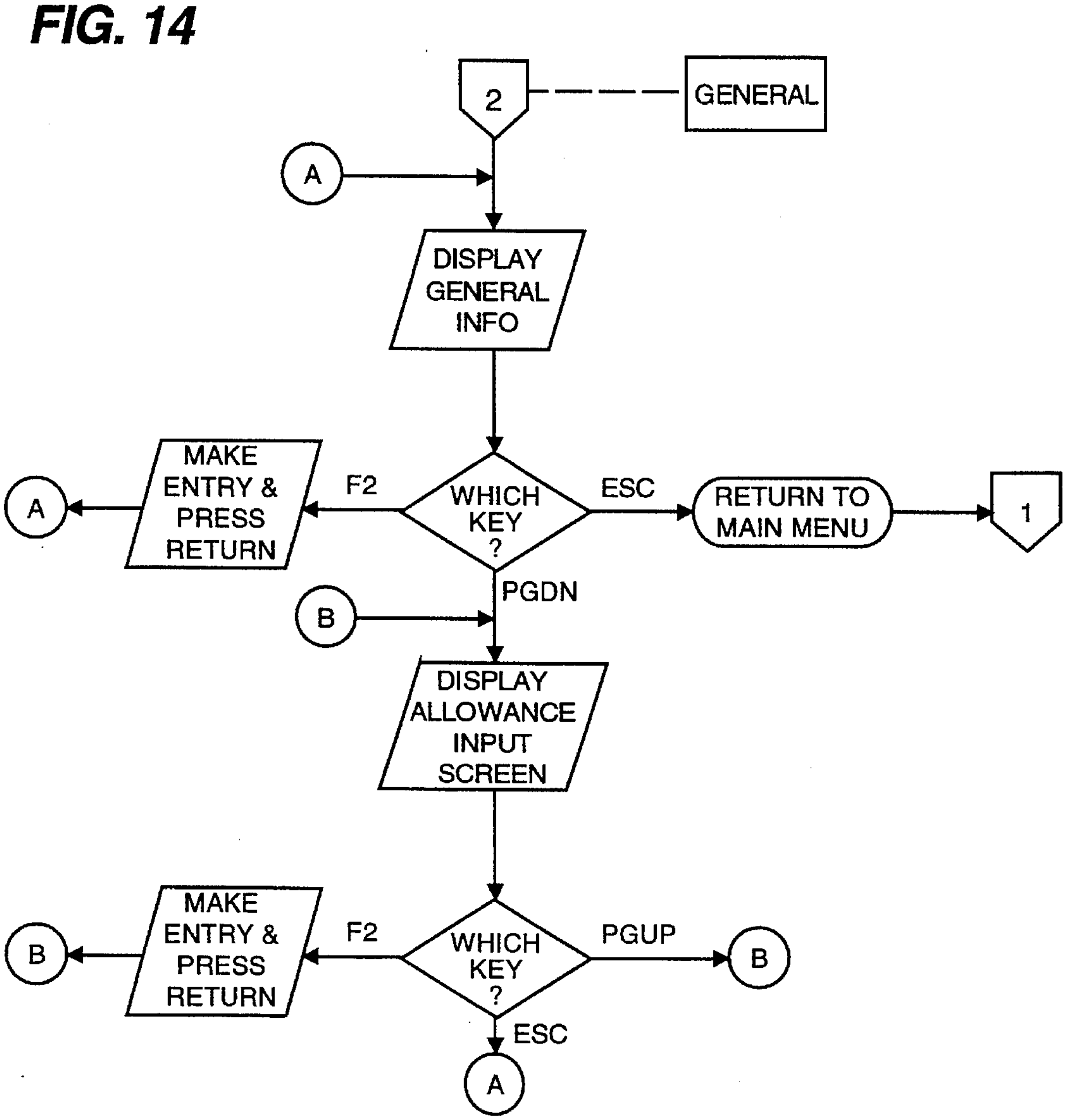
Figure 15:
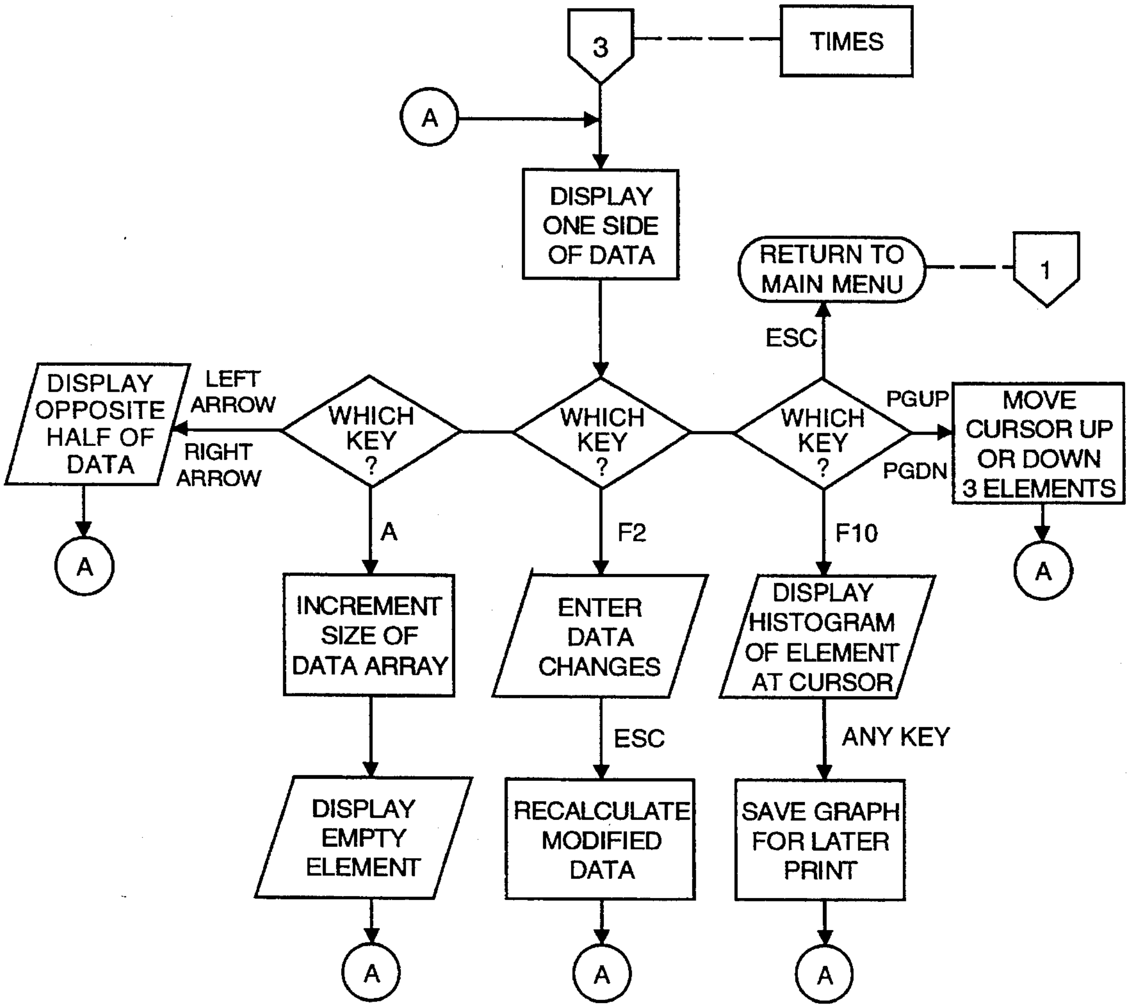
Figure 16:
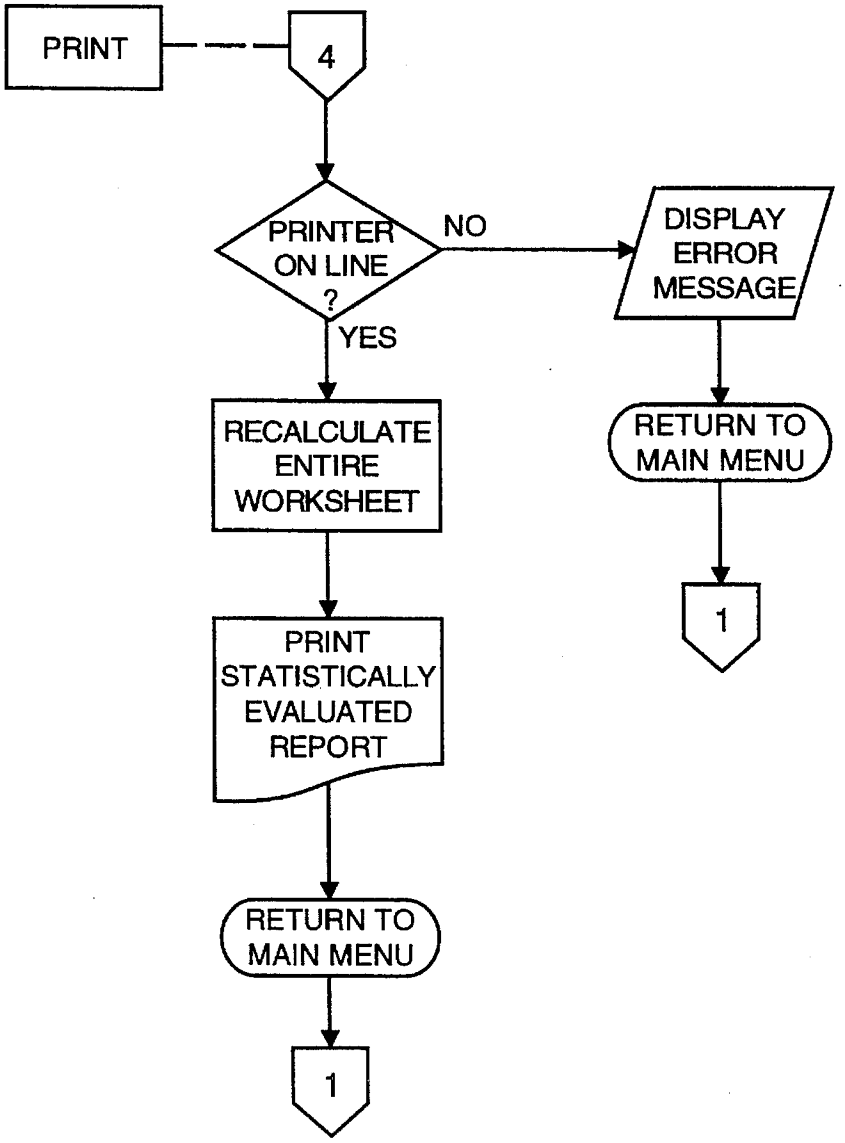
Figure 17A:
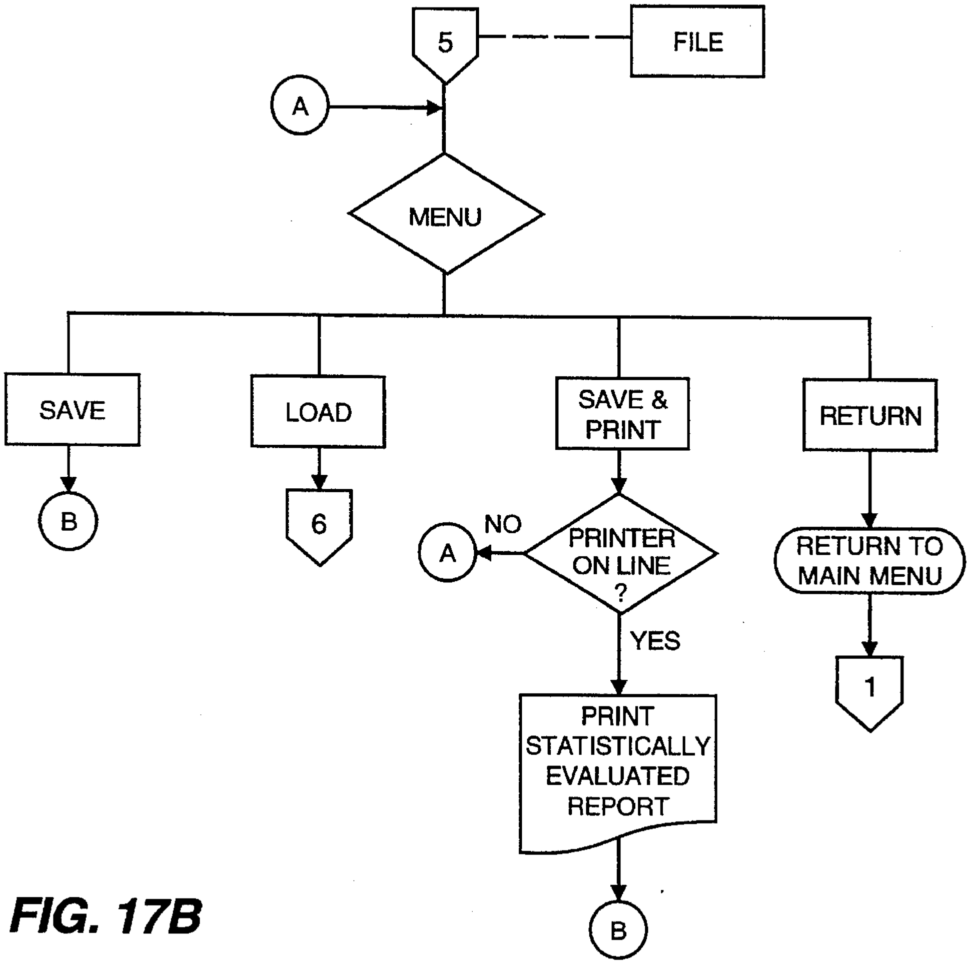
Figure 17B:
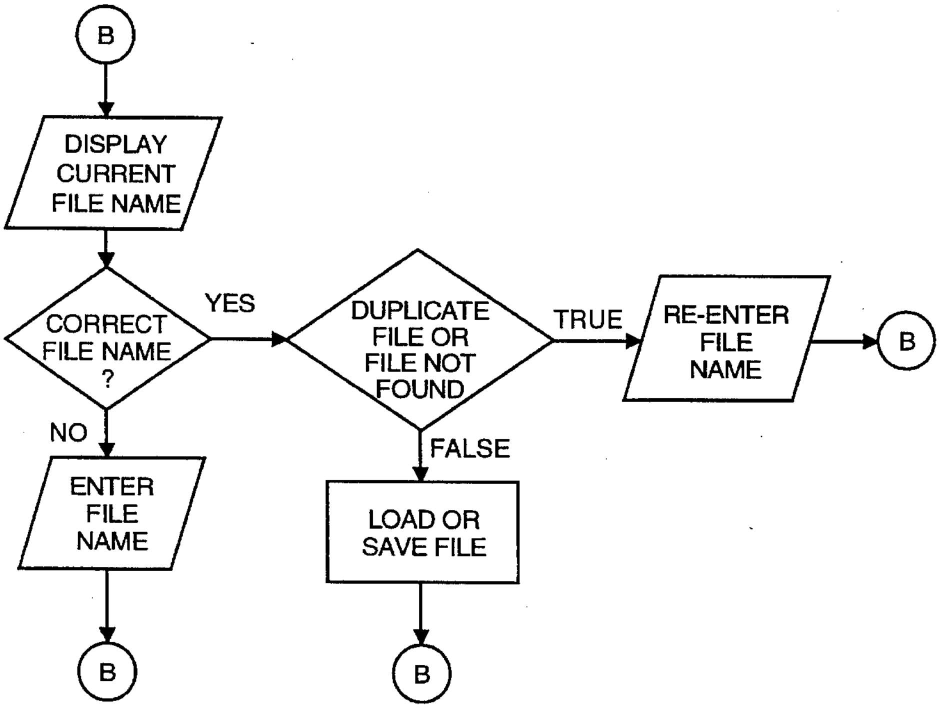
Figure 18:
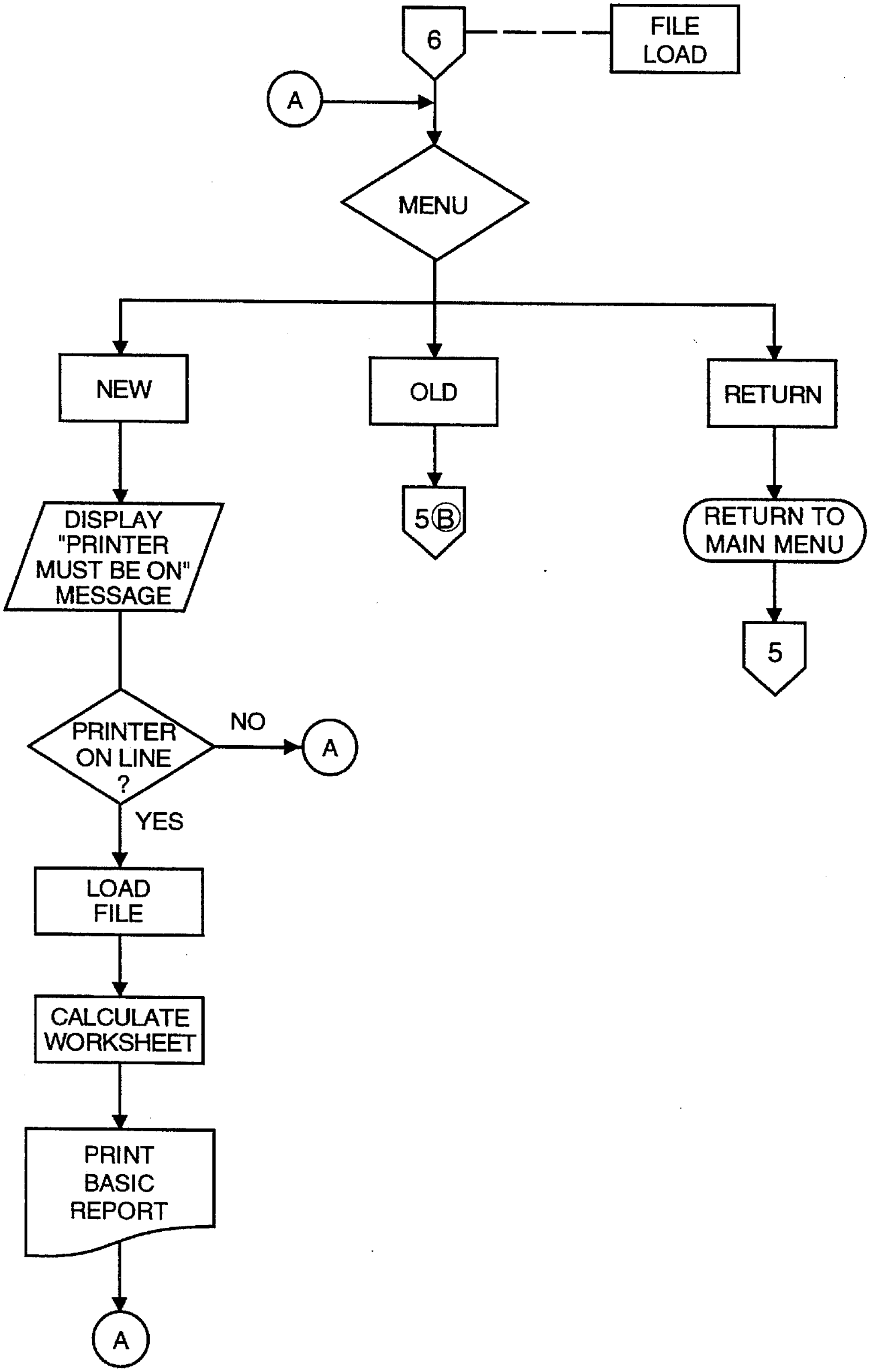
Figure 19:
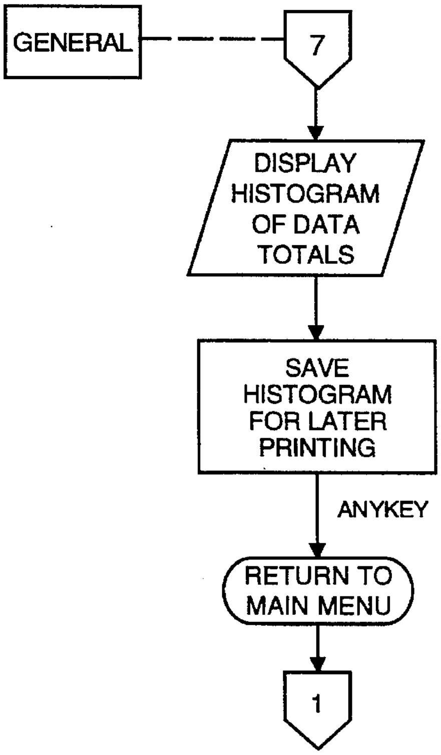
Figure 20:
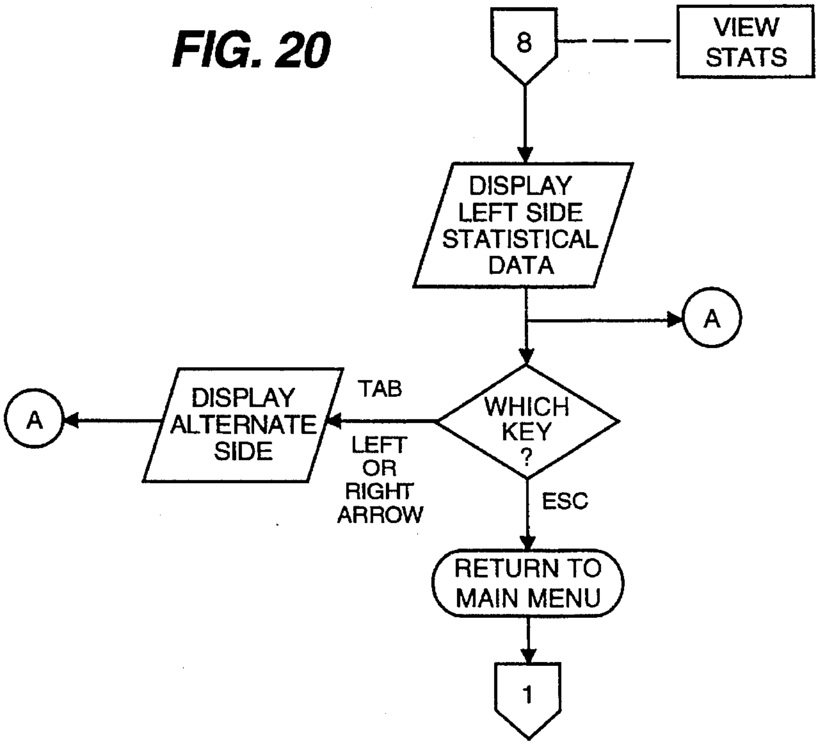
Figure 21:
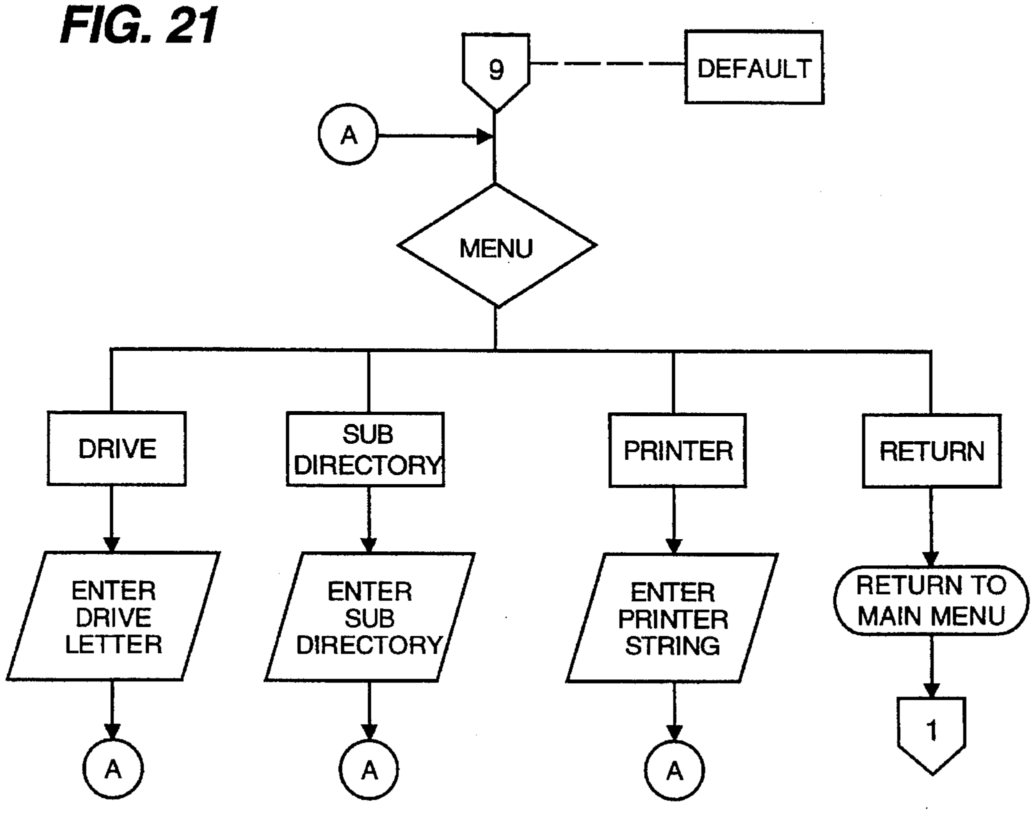
Figure 22:
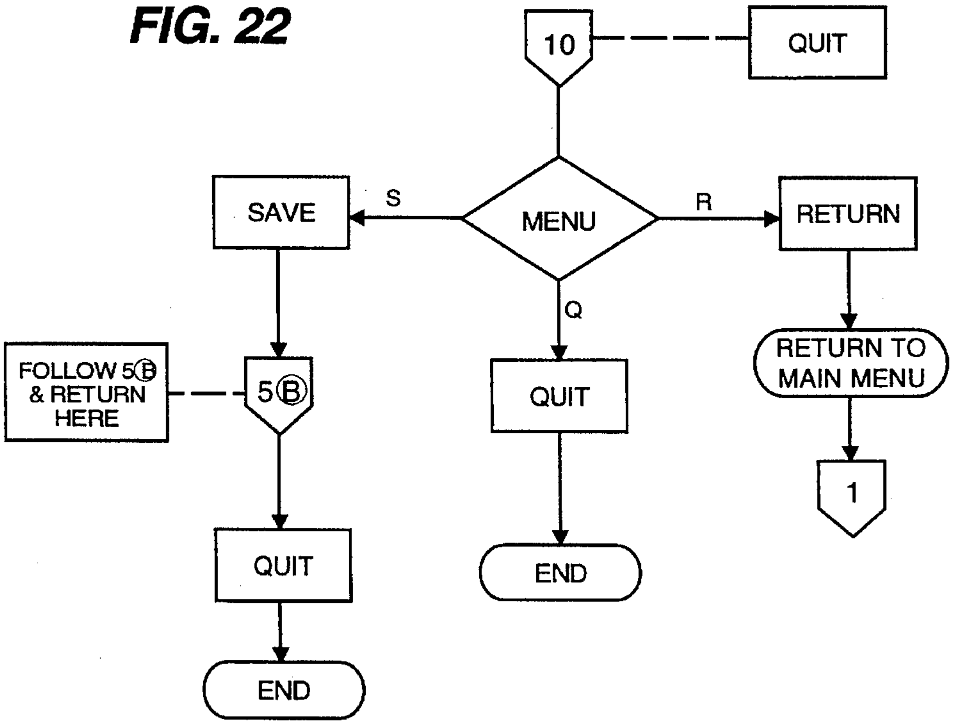
Figure 23A:
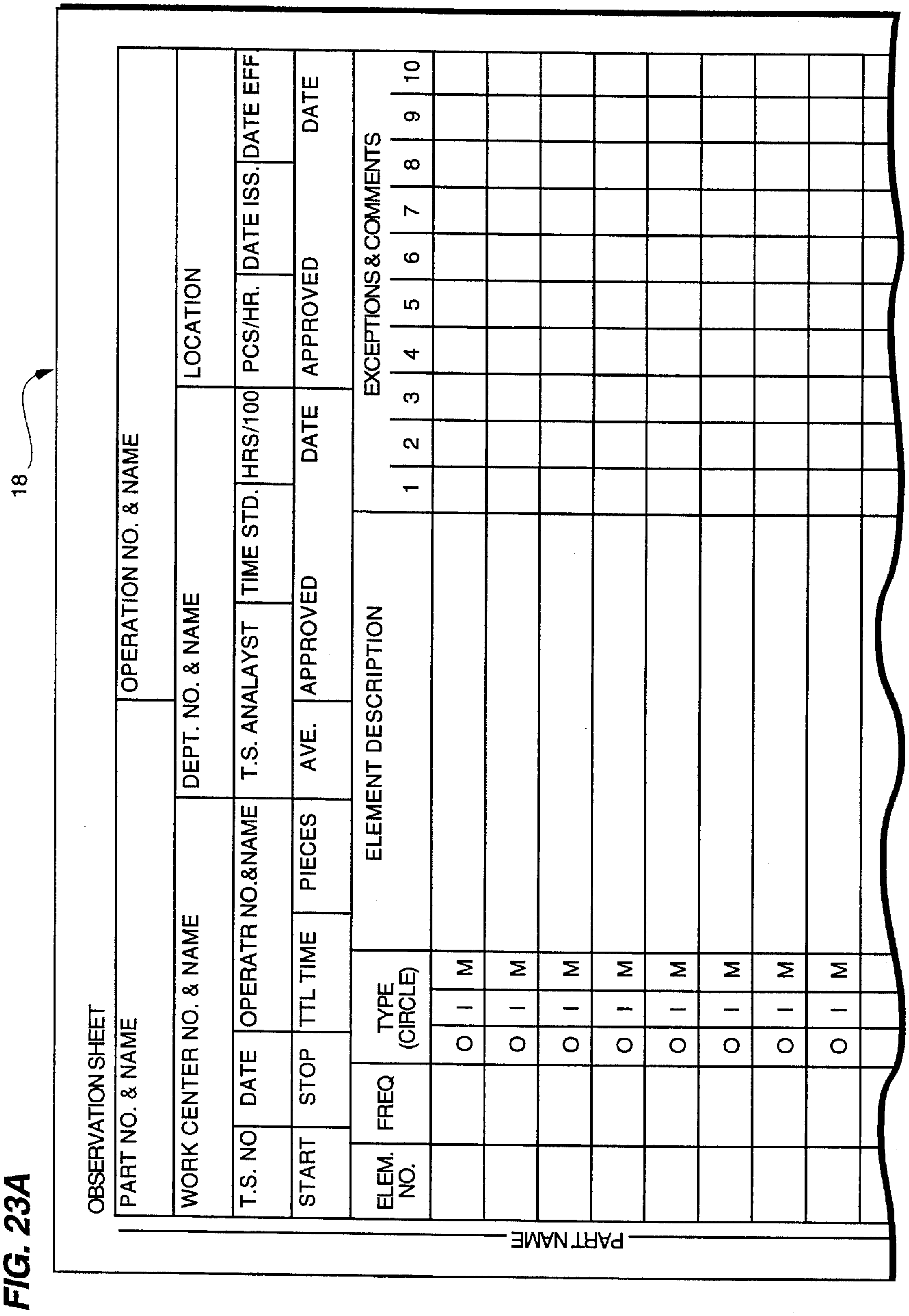
FIGS. 23A and 23B show the layout of a form which is clipped to the clipboard and filled out by an observer conducting a time study utilizing the data accumulating device of the present invention.
Figure 23B:
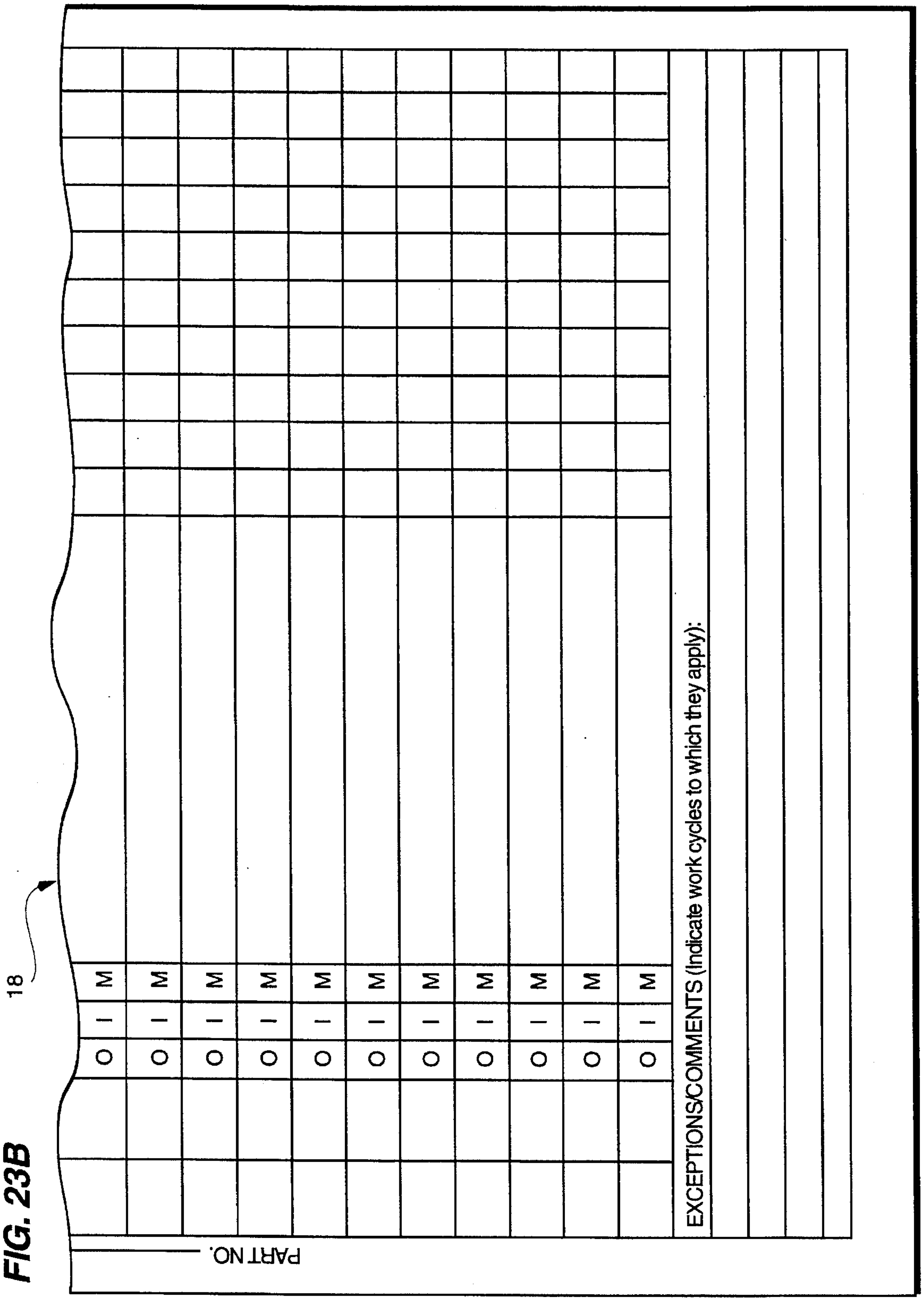
Figure 24:
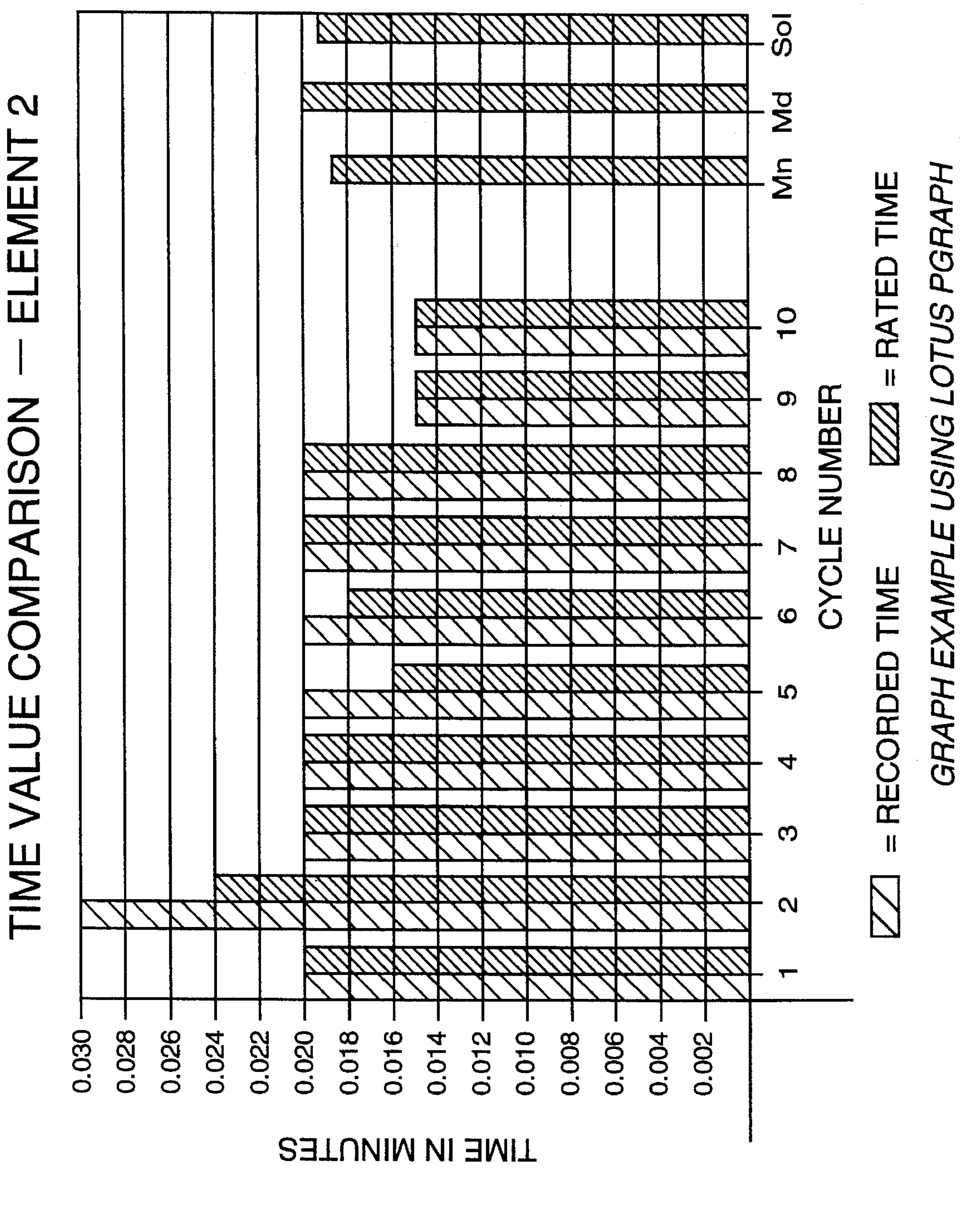
FIG. 24 is a histogram graph example prepared and printed by the personal computer from the data accumulated using Lotus®.

The computer assisted time study system of the present invention and the method for using same include a data accumulating unit or device 10 illustrated in FIGS. 1–3, an electronic circuit including a data accumulating an initial processing program, the flow charts for which are illustrated in FIGS. 9–11, a data transmitting program, the flow chart for which is illustrated in FIG. 12, the circuit elements of the electronic circuit including a microprocessor, a RAM, a ROM, buffer circuit elements, logic circuit elements, latch circuit elements, a clock circuit including oscillator, counter circuitry, resistor networks, inputs, outputs, and power supply circuit elements are illustrated schematically in FIGS. 4–6, down loaded data processing program, the flow charts for which are illustrated in FIGS. 13–22, a record sheet shown in FIG. 23, a personal computer in which the data processing program is stored, computer generated time study observations generated from the personal computer, and a histogram shown in FIG. 24 also generated from the personal computer using the data processing program stored therein.

As shown in FIG. 1, the data accumulating device 10 includes a clipboard 12 mounted on a body 14 containing an electronic circuit, including a microcomputer, the electrical circuit diagrams of which are shown in FIGS. 4–8.

An upper surface 16 of the clipboard 12 is adapted to receive a time study form 18 (FIG. 23) and held thereto by a spring clip or clamp 20.

The clipboard 12 has mounted in or on an upper portion 22 thereof a key pad, including keys 0–9, a CLEAR (*) key and an ENTER (#) key, special function keys: "STUDY", "CYCLE", "ELEMENT", and "RATING", and a visual display 24 for displaying data related to: "TOTAL TIME PER STUDY", "TIME- OUT", "MEMORY", and "BATTERY STATUS".

The upper right hand corner of the clipboard 12 has a cutout portion 26 forming a window having a transparent (plastic) pane mounted therein and having the following legends on an upper surface thereof: "READ", "TIME-OUT", "ON/OFF", "TRANSMIT" and "ERASE", as best shown on FIG. 3, positioned over toggle switches 31–35, respectively, mounted in and extending from the body 14 as best shown in FIG. 2 and includes legends and blank spaces for insertion of data involved in the taking of a time study, such as the name of the operators, character of the operation to be observed, name of the observer, etc.

Referring to FIG. 23, in the blanks under the heading ELEMENT DESCRIPTION on the form 18, are entered the names of the individual motions to be observed, such as picking up a part, securing it to another part, etc.

The device 10 includes in the electronic circuit within the body 14, timer circuitry coupled to the visual display 24 for indicating the time elapsed during the performance of an operation as measured by an observer using the "TIME-OUT" switch 32.

Figure 7:
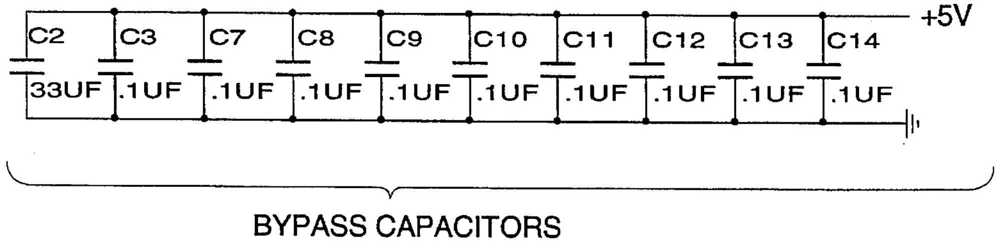
FIG. 7 is a filter circuit for the input voltage.
Figure 4B:
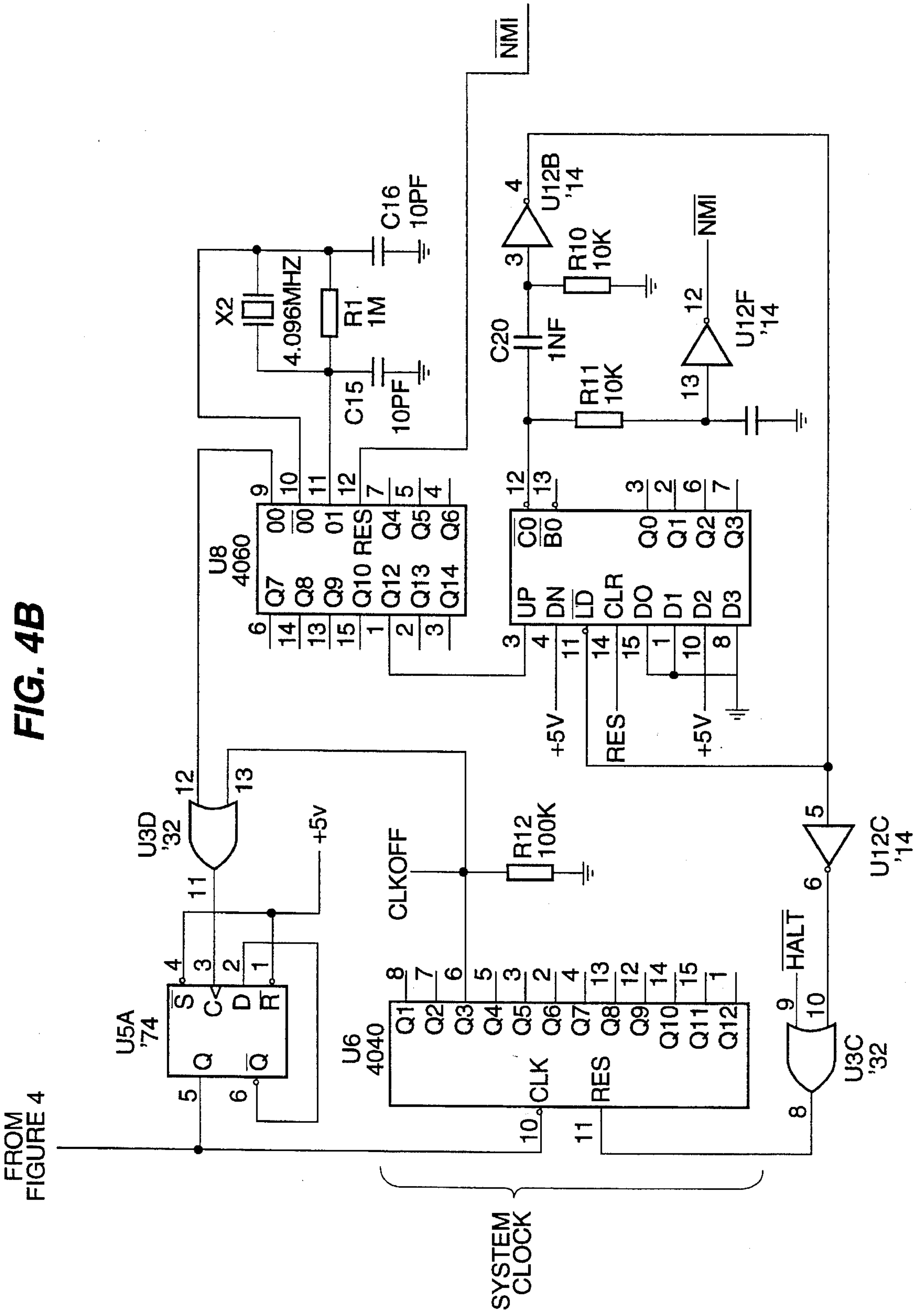

The components of the electronic circuit are illustrated in the detailed schematic circuit diagrams in FIGS. 4–8 and are identified as follows: FIG. 4: CPU, PROM, Device Decoder, System Clock; FIG. 5: Power On Reset, RAM, Memory Control Gating Circuit, Universal Asynchronous Receiver Transmitter (UART), Latch Output, Display Control Gating Circuit, Clock Control Latch, Resistor Network, Input Gate; FIG. 6: Bi-Directional Bus Driver, Display, Keypad Switches, Serial Port Connector, Test Points; FIG. 7: Bypass Capacitors; and, FIG. 8: Battery Charging and Converter Circuit, the function and operation of which are readily apparent to a skilled computer engineer.

Referring now to FIGS. 3–8, the manner in which the data recording device is utilized is described below.

Once a user has mounted a time study form 18 on the clipboard 12 and filled out all the information required to identify the time study he is ready to do a time study. He then presses the "ON" switch and enters a number for the study with the number keys to identify the study he is making. If there are already studies stored in the microprocessor, then the next available number would show up on the display 24 and he marks that number on the time study form 18.

As shown in FIG. 4, the System Clock includes a 4.096 megahertz crystal oscillator or simply a 4 MHz clock. A signal on the line $\overline{NMI}$ serves as a system tick for triggering the CPU. The system tick paces the software and is supplied to goes into a reset pin 12 of U8. U8 is a counter and from the basic clock of 4.096 MHz it develops two (2) frequencies. It passes the 4 MHz signal through to pin 9 which is supplied to the OR gate U3D where it is divided by 2 and supplied by U5A as a clock signal of 2 MHz to pin 6 (the clock input) of the CPU to operate the microprocessor.

Then at pin 1 from U8 you have another frequency of 1 Khz. That frequency is supplied to the counter below (74193). The counter has six (6) outputs, but the microprocessor only use one of them, namely the frequency at pin 12.

The $\overline{NMI}$ signal comes in to $\overline{NMI}$ pin 17 of the CPU, U1, at intervals of 12 milliseconds. As a result the basic tick is 1,000th of a minute. The ticks come in and operate the clock of the CPU which outputs a clock signal in minutes up to three decimal places or in hours up to five decimal places.

The Time Out switch is pressed to stop the clock at a time interval that is stored in the RAM.

The PROM in FIG. 4 stores the software code and messages for operating the CPU.

The Device Decoder is used to direct signals to the appropriate devices.

In FIG. 5, U10 is a UART which stands for universal asynchronous receiver transmitter which sends data that has been saved in the RAM out to a PC.

The Latch Output U14 drives the keyboard.

The Memory Control Gating Circuit inputs an RD "read" signal and an MR "memory request" signal into an OR gate U3A and the output signal $\overline{MRD}$ "memory read" that is supplied to the $\overline{MRD}$ pin 22 of the RAM U15. The output signal $\overline{MWR}$ from the OR gate U3B is supplied to the $\overline{M\ WR}$ input at pin 27 to the RAM U15.

The Display Circuit Control Gating Circuit controls the display 24.

The Clock Control Latch U5B provides for orderly shut down when the power is turned off and prevents the user from erasing data.

The Resistor Network RN1 keeps the inputs from floating and ties them to system ground.

The Input Port Gate controls the inputs from the keyboard to the RAM.

In FIG. 6, the Bi-Directional Bus Driver is basically a buffer circuit for isolating the display 24 from the microprocessor. The Serial Port Connectors connect the UART to the PC.

The Bypass Capacitors in FIG. 7 are used to filter the +5 volts.

The Battery Charging Circuit and Converter changes the battery voltage to 3.6 to the +5 volts operating voltage.

Set forth below is a summary of the use of the data accumulating device 10 and the timer circuitry therein. In a Decimal Minutes mode up to 2399.999 minutes can be displayed. In a Decimal Hours mode, up to 23.99999 hours can be displayed.

The steps carried out by an observer in using the data accumulating device 10 are as follows: Fasten a time study sheet (form 18—FIG. 23) to the upper surface 16 of the clipboard 12.

a. Conduct a preliminary observation of the work to be time studied.

b. Fill in manually the Time Study sheet headings with the customary time study information required by the company such as: part no and name; operation no and name; work center no and name; department no and name: time study no and name: the Time Study Analyst's name: name of the operator being studied; plus other pertinent information required by company policy.

c. The Work Elements should be entered in their customary sequence and assigned consecutive numbers. Provide a brief description (up to 90 characters per Element.)

NO FURTHER MANUAL ENTRIES ARE REQUIRED

When the device 10 is turned on the LCD displays in the visual display 24 fill in automatically.

a. The Study No. on the Time Study sheet 18 on the LCD display 24 MUST BE THE SAME. Modify the "Study No." and "Rating %", as desired, by using the key pad.

b. Start the device 10 by a single push and release of the "TIME-OUT" button or switch 32. The "TOTAL TIME per Study" display will immediately begin recording the elapsed time.

c. RECORD ELEMENT TIMES by a single depression and release of the "READ" button switch 31. This enters the Element time in the device 10 memory and simultaneously advances the display to the next Element and begins timing the next Element.

d. Elements that are "non-cyclical" (do NOT occur every cycle) should be pre-numbered where predictable, and the number entered on the time study sheet 18 after the regular element numbers. When a "non-cyclical" element occurs, press the ELEMENT button/key and use the key pad to enter the desired element number.

e. CYCLE NUMBERS NEED TO BE CHANGED at the beginning of each new cycle. Push the "CYCLE" button to advance the cycle number during the timing of the first element of a new cycle.

f. RATING or PACE-LEVELING can be changed at any time. Push the RATING button/key and use the key pad to enter the desired rating percent.

TO END STUDY: Push the TIME-OUT button/key to stop the device 10. Next push the STUDY button/key. When the STUDY button/key is pushed:

(a.) the TOTAL TIME display reads "END OF STUDY, wait . . . "; then resets to zero (b) the device 10 resets "Cycle" and "Element" no.s to 01 and the "Rating %" to 100.

After the study is ended, the device 10 automatically assigns the next Study No., followed by a question mark (?). If the study number is correct, press the ENTER button/key. Otherwise use the key pad to enter the desired Study No. Use ENTER button/key to confirm.

HOW TO TRANSMIT TO AN IBM COMPATIBLE PC.

a. Connect device 10 by a shielded connector cable to a PC where the software (FIGS. 13–22) for processing data has been installed.

b. Turn the PC on. At the C prompt (on the PC) type: TIMER. Then press Return (on the PC). The PC is now ready to receive data from device 10.

c. Turn device 10 on. After a moment, press the TRANSMIT button/key.

* * The display will show "SEARCHING, wait . . . "* *

Use the key pad to enter the number of the Time Study to be transmitted. (You must use a Study No. that has been ended. See paragraph above on ending a Time Study.)

d. Start the TRANSMISSION by pressing the ENTER button/key. The selected study is transmitted twice; and the two transmissions compared for accuracy. While the transmission is in progress, the display reads "TRANSMITTING, wait . . . "

The PC display will indicate the progress of the transmission.

HOW TO ERASE TIME STUDIES FROM THE DEVICE 10 MEMORY

The operator may erase ALL study records in the device 10 memory by holding the CLEAR button/key down while turning the power on. The memory file availability will now return to 100%.

Full erase procedure should only be used if operator is sure all the remaining studies have been transmitted to the P.C.

OPERATING INSTRUCTIONS FOR THE DEVICE 10

TOPIC

I. Power-On Procedure

II. Preliminary Procedures

III. Taking The Study

IV. Study Numbers

A. Changing the Study Number

B. Ending the Study

V. Cycle Numbers

A. Starting a New Cycle

B. Changing a Cycle Number

VI. Element Numbers

A. Setting the Element Number

B. Changing the Element Number

VII. Rating %

A. Changing the Rating Value

VIII. Transmitting Time Studies

A. To transmit immediately after making a study

B. You may transmit previous time studies by the following steps

C. Detecting Transmission Errors

IX. Erasing Time Studies

1. Full erase procedure
2. Selective erase procedure
3. Protection against accidental erasure X. Memory Management A. Charging the 3 Nicad C Cells B. Resetting Battery Status Display C. Replacing the C Cell Batteries XI. Controls For the Device 10

(a.) Definitions

XII. Exhibits (a.) Recommendation

OPERATING INSTRUCTIONS FOR THE DEVICE 10

I. POWER-ON PROCEDURE

Move the ON/OFF switch downward to the "ON" position. When the device 10 is turned "ON", several functions occur automatically.

In the top row of the LCD displays:

1. The "STUDY" display will be set at the next available "study" number. The cursor will be flashing in this display.

2. The "CYCLE" display will be set to 01 and the "ELEMENT" display to 001.

3. The "RATING" display will be set to 100%.

In the bottom row of LCD displays:

(Note: If the bottom row of LCD displays is blank, turn device 10 off, count slowly to 3, turn device 10 back on.)

1. The "Total Time per Study" display will be zero; pending start of the study. Time displayed will:

(a) read up to 2399.9999 minutes (equivalent to 39.99+ hours) and will be followed by an "m" if device 10 is a decimal minute watch.

(b) read up to 23.99999 hours and will be followed by an "h" if device 10 is a decimal hour watch.

2. The "TIME-OUT" display will show "T" (time-out).

3. The "MEMORY" display will indicate the percentage of memory remaining.

4. The "BATTERY" display will indicate how many operating hours remain before the 3 ni-cad C cell batteries must be recharged. The last operating hour (60 minutes) is shown as minutes.

The power-on/off function does not affect previously stored time studies.

| STUDY | CYCLE | ELEMENT | RATING |
|---|---|---|---|
| 01 | 01 | 011 | 100 |
| 0000.000M | T | 99% | 99h |
| TOTAL TIME PER STUDY | TIME OUT | MEMORY | BATTERY STATUS |

II. PRELIMINARY PROCEDURES

1. Fasten a Time Study sheet 18 to the front of the device 10. Two alternate types of Time Study sheets can be used on the device 10:

a.) the customary Time Study sheet 18 with provision for recording all of the time observations, as required in conventional studies.

b.) the unique device 10 Time Study sheet 18 with provision for recording only the manual entries as specified in paragraphs 3 and 4 below. No further manual entries are required. Space is not provided for recording entries that will be calculated and documented using the device 10 software system. (See FIGS. 25 and 26).

2. Conduct a preliminary observation of the operations.

3. Fill in manually the customary time study information at the top of the Time Study sheet 18. Typical time study information includes: part number and name; operation number and name; work center number and name; department number and name; time study number; date; name of the Operator being time studied; the Time Study Analyst's name; plus other pertinent information required by company policy.

4. Fill in manually the Work Element names, in their customary sequence, along the left side of the Time Study sheet. Space is provided on the PC print-out of the time study, for a brief description—up to 90 characters—per Work Element.

The regular Work Elements are assigned consecutive numbers.

The occasional (often called Non-Cyclical) Work Element names and numbers are entered below the regular Work Elements. (Non-cyclical elements may need to be assigned and described as observed during the study).

The Work Elements must be described and numbered consecutively on the Time Study sheet for clarity:

during the time study of the operations, and when preparing the computer generated reports.

IF PREFERRED, ELEMENT TIMES CAN BE RECORDED MANUALLY by pressing the "READ" button/key down to freeze the timing display; and then releasing the button/key after the timing has been read. The timing is continuous, without lost "snap-back" time as in mechanical systems.

See FIGS. 25 and 26 for examples of typical time study information.

III. TAKING THE STUDY

When ready to take the study:

a. Use the "ON/OFF" switch to turn the device 10 "on". This is done by moving the switch lever downward away from the Time Study sheet.

b. START THE device 10 by a single depression and release of the "TIME-OUT" button/key. The "TOTAL TIME per Study" display will immediately show that the clock is running as it begins recording the elapsed time. The "T" will no longer show in the "TIME-OUT" display.

c. RECORD ELEMENT TIMES by a single depression and release of the "READ" button/key. The element time is recorded in the device 10 memory, and the next element timing begins. The "ELEMENT" number automatically advances to the next number.

d. CYCLE NUMBERS NEED TO BE CHANGED at the beginning of each new cycle. Push the "CYCLE" button/key to advance the cycle number during the timing of the first element of a new cycle.

Differences between "READ" and "TIME-OUT" button/keys.

The "READ" button/key freezes and unfreezes the Time display. The READ button/key does not stop and start the device 10. Only the TIME-OUT button/key starts and stops both the Time display and the timing operation without resetting the device 10. [Note: the letter "T" will show in the TIME-OUT display when the device 10 is in the TIME-OUT mode.]

TIME-OUT is used to stop the study and resume again when appropriate. Depressing the side "TIME-OUT" button/key will stop the timing; a "T" will appear in the display. To resume the study, depress the "TIME-OUT" button/key again and the timing continues where it had been stopped and the "T" display disappears.

EXCEPTIONS AND ADJUSTMENTS during the time study are typical and should be applied in accord with sound engineering practices set forth at each location.

It is common that certain activities will be disallowed or eliminated from the study without record. A typical example would be break-times or other stoppages. Procedures for these activities are subject to policy at each location.

IV. STUDY NUMBERS

Immediately after the device 10 is turned on, it is ready to start recording time study data. When the device 10 is turned on, the device 10 automatically displayed the next available time study number in the STUDY display.

A. Changing the study number.

The Analyst may override the device 10, by the following procedure:

(1.) When device 10 is in TIME-OUT mode, press STUDY button/key. device 10 displays "END OF STUDY wait . . . ": This is a fail safe precaution to be sure previous study is closed out before new data is entered.

STUDY display will show question ? mark after the Study number.

(2.) Key in any desired two-digit number. (Note—convert numbers 1 through 9 to two digits, by entering a zero in front of the single digit number.

(3.) Press ENTER button/key.

The above sequence will result in:

(a.) The requested study number being accepted; or (b.) The requested study number being rejected by the device 10 because a study of the same number is found in the device 10 Memory Bank. The device 10 display will show: "STUDY ALREADY EXISTS". That STUDY number should NOT be used; if it is used, the results will be defective. The new time study will be mixed in with the old study.

B. Ending the study:

To end the study, first press the TIME-OUT button/key, then press the STUDY button/key. The time display will read: "END OF STUDY, wait . . . ".

This action results in the following:

(a) Ends the time study for that number.

(b) Enters the next available study number, followed by a question mark. If that study number is acceptable, press the ENTER button/key to activate. If not, change the study number as described in Section A above.

(c) Sets the cycle and the element numbers to 1.

(d) Stops the device 10 and resets the "Total Time/Study" display to zero.

(e) The cursor is moved to the study number display.

V. CYCLE NUMBERS (a) Starting a New Cycle

Pressing the CYCLE button/key at any time during "timing" results in the following:

a. The cursor is moved to the cycle display.

b. The cycle number is incremented, (goes to the next higher cycle number.)

c. The element number automatically is set to 1, the first element of the new cycle.

(b) Changing a Cycle number.

The operator may change the cycle number by pushing the number keys until the desired cycle number is displayed. Maximum Cycle number allowed is 99.

VI. ELEMENT NUMBERS (a) Setting the element number—in the Element Display.

The element number is incremented, (increased by 1), when the timing display is reactivated (unfrozen) by the release of the READ button/key following the "read" operation.

(b) Changing the element number.

NON-CYCLIC ELEMENTS can be entered in a study by resetting the element number of that portion of the study. The "ELEMENT" button/key above the display is depressed to move the cursor to that display. The new element number is entered using the key pad. Maximum Element number allowed is 999. Three digits are required beginning with any preceding O's; then the # key. That number will be entered in the Element display and the study data entered in the correct sequence in the "Memory file". (Normally non-cyclic elements require writing notes to define the exception or other details on the study sheet.) TO RETURN TO AN ELEMENT within the previously assigned element numbers, THE ELEMENT MUST BE RESET to the desired number using the key pad and the above procedure.

Pressing the ELEMENT button/key at any time in the "timing" mode results in the cursor being moved to the element display.

VII. RATING %

When the device 10 is turned on, the rating value is automatically set to 100%.

(a) Changing the rating value.

RATING or PACE-LEVELING can be modified during each element and on each cycle: or for the overall study. This is accomplished by setting the "RATING %" once at the beginning of the study or continually during the study. CHANGE THE RATING by depressing the "RATING %" button/key above the display to move the cursor to that display. The new rating is entered using the keypad. Three digits are required, beginning with any preceding 0's. After the new rating % has been put into the device 10 display, press "ENTER" using the pound # button/key.

THE RATING DISPLAYED AT THE COMPLETION OF AN ELEMENT TIMING WILL BE ENTERED INTO MEMORY ALONG WITH THE TIME FOR THAT ELEMENT.

Once changed, it remains as the new setting for all remaining elements until changed again.

VIII. TRANSMITTING TIME STUDIES (a). To transmit immediately after making a study:

First press the STUDY button/key, to indicate the end of the study. Timing display will read "END OF STUDY, wait". Press the ENTER button/key. Next, press the TRANSMIT button/key. Timing display will read "SEARCHING, wait".

Timing display will show the STUDY number and a ? mark. Press the ENTER button/key to activate the transmission. Timing display will read "TRANSMITTING, wait . . . "

(b) You may transmit previous time studies by the following steps:

(1.) Press the TRANSMIT button/key.

(2.) Select a study number. Press the ENTER button/key. When the TRANSMIT button/key is pressed, The device 10 Timer may be either empty or it may contain a number of studies.

In the event the device 10 Memory is empty, the display will read "TIMER EMPTY, press CLEAR". The CLEAR button/key should be pressed to cancel the message.

If the device 10 is not empty, the first (lowest) available study number will be displayed. At this point the Analyst may accept the number found by the device 10 by pressing "ENTER". Or may select a different study number.

If the Analyst selected a study that is not in the device 10's memory bank, the following message "STUDY NOT FOUND" is displayed. Use the CLEAR button/key to erase the message.

(3) Start the TRANSMISSION by pressing the ENTER button/key.

Following the last step, the selected study is transmitted twice. While the transmission is in progress, the display reads: "TRANSMITTING, wait . . . "

(c) Detecting Transmission Errors

The receiving program in the PC compares the first and the second block of the received data. Normally, these two blocks are identical. This results in the output file "DATA.PRN" being written to the hard disk of the PC.

If the two blocks are different due to transmission errors, the following message "UNSUCCESSFUL . . . Exiting" will be displayed on the PC monitor. Under these conditions, the Analyst should repeat the operation of transmitting the selected study.

IX. ERASING TIME STUDIES

The primary function of the "CLEAR" button/key (located on the top of the boards is to wipe out entries before they go into the Memory Bank.

The primary function of the "ERASE" button/key (located on the side of the board) is to erase entries in the Memory Bank.

There are two erase procedures available:

(1) full, and (2) selective.

1. Full erase procedure.

Full erase will erase all study records in the device 10 memory bank. This is accomplished by depressing the CLEAR button/key for 1 to 2 seconds, while turning the power on.

The Memory File availability will now return to 100%.

Accidental erasure may be overruled by a single depression of the CLEAR button/key.

2. Selective erase procedure. Studies may be erased selectively by following these steps:

a. Press the star * (CLEAR) button/key. The first available study number (lowest available) will be displayed.

b. Enter the study number to be erased.

c. Press the pound # (ENTER) button/key to activate the erasure of the selected study.

Time display will read: "Erasing WAIT".

If the selected study number does not exist in the memory file, the display will read: "STUDY NOT FOUND, Press Clear".

The CLEAR (star *) button/key should be pressed to clear that message.

3. Protection against accidental erasure.

Accidental depression of the ERASE button/key need not lead to data being erased. The erase procedure is inactive in the process of data entry. The erase procedure becomes active only after the time study is ended. (See Ending the Study, page 3.1).

Once the study is terminated, the depression of the ERASE button/key may be overruled by a single depression of the CLEAR button/key.

X. MEMORY MANAGEMENT

The device 10 memory bank is capable of storing 2000 elements, regardless of the number of studies and cycles. Each time the READ button/key is operated, an average block of 16 bytes is stored in the timer, thereby decreasing the amount of the available memory by 0.05%.

It is recommended that at the end of each study, the Analyst uses the "On/Off" switch to turn off the device 10. This action simultaneously clears the top 4 LCD displays and stores the completed study in the device 10's "Memory "Bank". The Memory file is very large (over 60,000 digits), usually enough to store 3 to 4 days of intensive studies.

When the device 10 is empty, the memory availability is 100%. Since the display does not show fractions of one percent, recording the first element causes the display to change to 99%. This obviously does not mean that the first element used up 1% of the available memory. Consequently, the available memory display should be treated as an approximation. The simple rule is: 20 elements=1%.

As recording of data into the "Memory Bank" subtracts from the available memory, the process of erasing increases the available memory. It is, therefore, recommended before studying a large number of elements, that the Memory Bank is purged of old data, (providing such data has already been transmitted to the PC for storage.)

The process of searching for the first available study number for the purpose of transmitting or erasing is essentially instantaneous. However, under the worst case condition, it may take several seconds. The worst case condition is when there is only one study left in the device 10, its number is 99 (the highest possible), and it is located at the end of device 10's memory bank.

Consequently, the fastest device 10 operation is assured when the operator follows the automatic selections of the study numbers and erasing of the Time study data is done often.

[A] CHARGING THE 3 NICAD C CELLS

Turn the device 10 off. Then connect the Battery Charger to the device 10.

The batteries are discharging whenever the device 10 is on. The batteries are NOT being charged when the device 10 is on, even if the charger is connected. Customary battery status display shows time remaining in hours plus the letter "h" for hours. When the time remaining drops to less than 2 hours, the display will show minutes. For example: ½ hr will read 30 m. When the batteries are fully run down, the display will show "O".

The typical current draw by the device 10 from the battery is 8 mA. The batteries are recharged at a ratio of about 7 to 1, giving 7 hours of run time for each hour of recharge time. Recharging 14 hours gives about 98 hours run time. It is safe to leave The device 10 Battery Charger connected to the device 10 longer due to its special design. If possible, always recharge batteries 14+ hours. That will give fully charged batteries.

The Battery Status display is incorporated into the device 10 for the Analyst's convenience. It measures actual use of power rather than the remaining power. It is recommended that the batteries be recharged before the display shows only one hour of operating time remaining. At that low level, the device 10 operation may come to a halt at any time and without further warning.

[B] RESETTING BATTERY STATUS DISPLAY

When the C cell batteries are recharged, you should reset the BATTERY STATUS display to 100 hours. To reset the Battery Status display, hold one of the numerical button/keys depressed, while turning the power on. To reset the Battery Status to 100h, hold down button/key 0. To reset to 10h (10 hours), hold down button/key 1. To reset to 20h, hold down button/key 2, etc.

[C] REPLACING THE THREE C CELL BATTERIES

The device 10's C CELL are in a rectangular container inside the back of the case. Remove the exposed four corner screws to gain access to the batteries. For replacement, use only Nicad C cell batteries.

Alkaline C cells should not be used in connection with a battery charger: they can explode. Follow battery manufacturer's direction on disposal of Nicad C cell batteries.

XI. DEVICE 10 CONTROLS

The Timer Controls include 20 momentary push Button/keys and 1 ON/OFF toggle switch. They are used as follows:

| PUSH Button/key LOCATION | PUSH Button/key FUNCTION |
|---|---|
| - Above Each Display - | |
| STUDY | selects study number for editing |
| CYCLE | selects cycle number for editing |
| ELEMENT | selects element number for editing |
| RATING | selects rating number for editing |
| - On key pad - | - which follows typical phone key pad layout - |
| 0 . . . 9 | used to enter number(s) for the selected field. |
| * CLEAR | clears (cancels) messages to transmit or erase. |
| # ENTER | starts (activates) transmission or erase. |
| - On side of board - | |
| READ | freezes and un-freezes the Time Display. (Simultaneously resets the time to zero; does not stop the clock.) |
| TIME-OUT | starts and stops the clock. (Does not reset the time.) |
| TRANSMIT | selects the transmission mode. |
| ERASE | selects the erase mode. |

The ON/OFF toggle switch is also on side of board for turning device 10 on and off. Do not "snap" the toggle switch on and off. When device 10 is turned off, it should be left off for 1 to 2 seconds before being turned back on.

DEFINITIONS

1. The term "device 10" or "TIMER" means the device in its entirety. The term "clock" is used interchangeably with the term "TIMER".

2. The term "timer battery" means the rechargeable C cell battery pack which provides the operating power to the device.

3. The term "battery status" refers to the display built into the device 10 for the purpose of monitoring the number of operating hours remaining before a battery recharge will be necessary.

4. When recording time studies, the term "next available number" means the lowest study number that has not been used.

5. When transmitting or erasing, the term "first available number" means the lowest study number that exists in the Memory Bank.

The device 10 Timer is used to record a Time Study. The Timer displays cumulative time for each element of the Time Study and total cumulative time for the Time Study. When the Time Study is complete, the data stored in the Timer is transmitted to a PC computer.

This data is then loaded into the device 10 Software for editing, statistical evaluation, graphs, and printed reports.

The computer printed reports show individual (snap-back) times for each of the elements, plus mean and median snap-back totals for the Time Study.

LOTUS 123

The device 10 Software is color capable; colors displayed are dependent on which version of LOTUS 123 is being used.

A. PC REQUIREMENTS

The device 10 software requires an IBM Personal Computer or compatible, (AT recommended), plus:

Lotus 123 Version 2.0 or higher, including Lotus PGraph, installed on PC.

At least 640K of Ram.

DOS version 3.0 or greater.

Hard drive and one floppy drive.

At least 500K of storage space on hard drive.

The System, (both the timer and the software), require a printer capable of printing 132 characters across.

a. Condensed type will print on 9½" wide computer paper, net space 8½" wide.

b. Regular type will require 14½" wide computer paper.

Graphics printer is necessary to print graphs.

Basic user knowledge of Lotus Pgraph is necessary to print Histograms.

B. TIME STUDY LIMITATIONS

Maximum Cycles=10

Maximum Elements=100

Description Field Length=90 characters

C. INSTALLATION

1. Place The device 10 program disk in the A drive.

2. Type A:INSTALL (then press [Return])

(a.) The install program will create a subdirectory named FAEHR on your C drive, and copy the program files to that directory. It will also copy a batch file to the root directory of your C drive.

(b.) This completes the installation process. The device 10 System is now ready to use.

(c.) Take out the device 10 Software disk and store in a safe place.

II THE SYSTEM

Is essentially a system for accumulating time study observations and calculating time study data from those observations. The System is divided into two separate steps:

Step 1 is to transmit the data from the device 10 to the computer and store the data on the computer disk drive.

Step 2 is Data Analysis which loads the Time Study data from the disk drive into a spreadsheet for editing, statistical evaluation, graphs, and printed reports.

TRANSMITTING FROM THE DEVICE 10

1. Connect the device 10 to the computer, while the computer is turned off. Use the 6' shielded cable supplied with the device 10.

2. Turn on the computer.

3. If the computer is not in the root directory, or if you are unsure what that means Type CD\ (then press [Return])

4. While in the root directory of C drive,

Type TIMER (then press [Return])

When the transmit program is loaded, the computer is ready to receive data from the device 10.

Turn The device 10 on and initiate the transmit procedure. When the transmission is complete, the data is now on the computer disk drive and The device 10 can be turned off.

III HOW TO START UP THE SYSTEM

1. Make sure your printer is ready to print 132 columns.

2. Start Lotus. When loaded:

type /FRX (then press [Escape])

type C:FAEHR\FAEHR (then press [Return])

After a short while, the device 10 software will display the following Menu:

General Times Print Files Cycle-graph View-Stats Default Quit To select files, use the arrow keys to move the cursor to the word Files and press Enter, or press the letter F only and a second menu will display the following:

Save Load Save & Print Return
Transfer Time Study to Worksheet

To select Load, use the cursor keys to move the cursor to the word Load and press Enter, or press the L key only. A third Menu will display and three additional commands become available:

New Old Return
Load-New
New Old Return

Load file as received from the device 10 * * * Note: Have PRINTER ready. * * *

To select Load New, move the cursor to the word New and press Enter.

Use this choice to load Time Study data that has never been analyzed. This menu choice requires that a printer be connected to the computer, turned on and ready to print. A screen message will display to remind you of this requirement.

The program will not continue unless the printer is ready. Press Y to confirm that the printer is ready to print. If the printer is ready, the current file name will be highlighted and a screen message will ask if the file name is correct. When loading a new study, the file name is correct. Press Y and the Time Study will be loaded. (If you decide NOT to load the new study at this time, press [ESCAPE].)

After loading the new study; the program will then jump to the System Options—General section and allow entry of the general information.

When the General Information portion is complete, press Escape.

The program will proceed to the Times portion, and allow entry of the Element frequency, the Element type, and the Element description.

Be sure to press F2 before making changes.

When complete, press Escape.

After a short delay, a report titled The device 10 Time Study Observations—Basic will automatically be sent to the printer. See FIGS. 25 and 26.

The Time Study values CAN NOT be edited until after this report has been printed.

When the printing of the report is finished, the program will return to the Main Menu.

IV SYSTEM OPTIONS

The top of your screen will display the following MAIN MENU: General Times Print Files Cycle-graph View-Stats Default Quit Below are explanations for each of the choices on the Main Menu.

A. * GENERAL *

General Times Print Files Cycle-graph View-Stats Default Quit options: View or Edit the General Information portion as described below.

To select General, use the arrow keys to move the cursor to the word General and press Enter, or press the G key. See FIGS. 26 and 27.

This command has the following two modes—View and Edit.

General View Mode: You may view the general information as shown in FIGS. 24–26. Press [Page Down] to display the second screen. Press [Page Up] to return to the first screen. Press Escape to return to the Main Menu.

General Edit Mode: Use the cursor keys to move up and down the screen to highlight the field you wish to edit. If necessary, press [Page Down] or [Page Up]. When the field is highlighted, press F2 and type in the information you require. When finished with that field's entry, press [Return]. You may then use the arrow keys to move the highlight to the next field you wish to enter or edit. Continue in this manner until all fields as required are entered. Press [Escape] to return to the Main Menu.

Please Note:

1. You must press F2 to edit the field which is highlighted and you must press [Return] to complete the edit.

2. Fields which require percentage entries, such as DAYWORK or INCENTIVE allowances, must be entered as a whole number. Entering a decimal fraction (for instance 0.10) will produce unexpected results.

3. When finished, press [Escape to return to the Main Menu]. If the second GENERAL screen is on display, you must press [Escape] a second time to return to the Main Menu.

B. * TIMES—ENTERING TIME VALUES *

General Times Print Files Cycle-graph View-Stats Default Quit View or Edit the Time Study values To select Times, press the letter "T" only, or use the arrow keys to move the cursor to the word Times and press Enter.

This command has the following two modes—View and Edit. Viewing Time Values: You may view the time study data as shown in FIGS. 24–26. The time study data is split between a left and right screen. The following keys may be used to move the cursor for viewing the time study data:

(Up and Down Arrows)—move one element up or down.

(Left and Right Arrows)—jump one screen left or right.

(Page Up)—jump three elements up.

(Page Down)—jump three elements down.

(Home)—jump to the first element.

(End)—jump to the last element.

Viewing Graphs (Histograms): While in Times View mode, press [FIO] to display a graph comparing the recorded and the rated times for the element at the cursor position. After viewing the graph, press [Return]. A screen message will display asking if you want the graph just viewed to be saved to the disk drive. If yes, press Y and enter a file name.

If pressing [FIO] does not display a graph, please verify that Lotus 123 has been correctly installed.

If desired, the graphs saved to the disk drive may be printed at a later time using the Lotus PGRAPH program. (See your Lotus manual for information on how to print graphs.) Press [Escape] to return to the Main Menu.

Editing Time Values: Use the cursor control keys, as described above, to position the cursor at the element number to edit. When the cursor is at the desired element number, press [F2]. The very top of the screen will clear and you will be able to enter data into the fields for that element of the time study. You can edit all cycles of the element number(s) you select.

Use the [Arrow Keys], [Home] and [End] to move the cursor. Some of the fields are automatically calculated and cannot be edited. You will not be able to move the cursor to these fields.

Move the cursor to the field to edit. Enter the change and press [Return]. Move the cursor to the next field to edit, make your entry, and press [Return]. Continue in this manner until all editing of the element's fields are complete.

To quit editing an element and return to the Times View mode, press [Return] without making an entry, or press [Escape]. The message "Please WAIT. Recalculating . . . " will display at the top of the screen while the computer calculates the new rated, mean, and median times based on the editing changes you have made.

After recalculation is complete, you are in the View Mode. Move the cursor, as described above under "Times View Mode:", to the next element to edit. Press [F2] and repeat as above. Continue in this manner until all desired editing is complete.

Press [Escape] or [Return] to quit editing an element. Wait for recalculation to complete and then press [Escape] a second time to return to the Main Menu.

C. * PRINT *

General Times Print Files Cycle-graph View-Stats Default Quit Print statistically evaluated TIME STUDY report To select print, use the arrow keys to move the cursor to the word Print and press Enter, or just press the P key.

A statistically evaluated Time Study report will be sent to the printer. It is necessary to have your printer turned on, set to print 132 characters across, and on line. Note: condensed print is recommended; it will print 132 characters across on 9½" wide computer paper, net 8½ wide, a convenient filing size. Regular print will print 132 characters across on 14½" wide computer paper.

Please Note:

1. Your printer must be preset to print 132 columns; or use Default from the Main Menu and then select Printer to enter your printer's initialization string for condensed print.

2. Make sure your printer is properly connected, turned on and on line before selecting Print from the Main Menu.

D. * FILES *

General Times Print Files Cycle-graph View-Stats Default Quit Save & Retrieve Time Study information To select files, use the arrow keys to move the cursor to the word Files and press Enter, or press the letter F only. The following menu will display:

Save Load Save & Print Return

Save Time Study information

To select Save, use the arrow keys to move the cursor to the word Save and press Enter, or just press the letter S.

The current file name will be highlighted and a screen message will ask if the file name is correct. If correct, press Y and the Time Study will be saved to disk.

If not correct, press any other key and you will be allowed to reenter a new file name.

If you decide NOT to save at this time, press [ESCAPE].

E. * LOAD—NEW & OLD *

Save Load Save&Print Return

To select Load, use the cursor keys to move the cursor to the word Load and press Enter, or press the L key only. A third menu will display and three additional commands become available:

New Old Return

Load—New

New Old Return

Load file as received from the device 10 * * * Note: Have PRINTER ready. * * *

To select Load New, move the cursor to the word New and press Enter.

Use this choice to load Time Study data that has never been analyzed. This menu choice requires that a printer be connected to the computer, turned on and ready to print. A screen message will display to remind you of this requirement. The program will not continue unless the printer is ready.

Press Y to confirm that the printer is ready to print.

If the printer is ready, the current file name will be highlighted and a screen message will ask if the file name is correct. When loading a new study, the file name is correct. Press Y and the Time Study will be loaded. (If you decide NOT to load the new study at this time, press [ESCAPE].)

* Load—Old *

New Old Return

Load previously saved Time Study

To select Load Old, use the arrow keys to move the cursor to the word Old and press Enter, or just press the O key.

Use this choice to review or edit a previously analyzed Time Study. This command does NOT automatically print a report after loading the file.

The current file name will be highlighted and a screen message will ask if the file name is correct. If correct, press Y and the Time Study will be loaded.

If not correct, press any other key and you will be allowed to enter a new file name.

If you decide NOT to load at this time, press [ESCAPE].

* Load—Return *

New Old Return

Return to previous Menu

To select Load Return, use the arrow keys to move the cursor to the word Return and press Enter, or just press the letter R.

Use this command to return to the Main Menu.

Please Note:

1. When selecting Load New, a printer must be connected and ready to print. Also, the Time Study values cannot be edited until after the "Basic" report has been printed.

2. When selecting Load Old, the above restriction on editing does not apply.

F. * CYCLE-GRAPH (HISTOGRAMS) *

General Times Print Files Cycle-graph View-Stats Default Quit Display graph of total CYCLE time To select Cycle-graph, use the arrow keys to move the cursor to the word Cycle-graph and press Enter, or press the C key only.

This command will display a graph of the total Rated Times for all elements and cycles of the study. When finished, press [Return]. The graph just viewed will be saved to the disk drive.

If desired, the graphs saved to the disk drive may be printed at a later time using the Lotus PGRAPH program. (See your Lotus manual for information on how to print graphs. See FIG. 24.

Press [Escape] to return to the Main Menu.

G. * VIEW-STATS * (STATISTICAL EVALUATION OF TIME STUDY)

General Times Print Files Cycle-graph View-Stats Default Quit View Statistical Evaluation of Time Study To select View-Stats, use the arrow keys to move the cursor to the word View-Stats and press Enter, or just press the letter V.

This command will display the statistical evaluation of the Time Study. Press [Return] to return to the Main Menu.

Use the [TAB] key to alternate between the left and right sections of the statistical viewing area.

H. * DEFAULT *

General Times Print Files Cycle-graph View-Stats Default Quit Enter printer and disk settings To select Default, use the arrow keys to move the cursor to the word Default and press Enter, or just press the letter D. A secondary menu will display and four additional commands become available:

Drive Subdirectory Printer Return

Enter default drive letter

To select Drive use the arrow keys to move the cursor to the word Drive and press Enter, or press the letter D only.

Use this command to change the current (or default) drive letter for storage of the Time Study data. The right side of the screen displays an example of the format used to change the drive letter. Use drive A to store on a floppy, when a floppy of the Time Study data is needed at other locations. This approach is recommended only if storage on hard disk is not desired for confidentiality reasons. Alternate approach, if acceptable to have Time Study data on hard disk, is to make a copy of the data onto a floppy.

Drive Subdirectory Printer Return

Enter default subdirectory

To select Subdirectory, use the arrow keys to move the cursor to the word Subdirectory and press Enter, or just press the letter S.

Subdirectory choices: The hard disk subdirectory is often used to store data by categories, such as: Machining; Assembly; Office; etc. These subdirectories need to be set up in advance of the Time Study to agree with the company's practices. The convenience of The device 10 System may make it desirable for the company to establish more categories than used in the past.

Drive Subdirectory Printer Return

Enter printer code for condensed print

To select Printer, use the arrow keys to move the cursor to the word Printer and press Enter, or press the letter P only.

Use this command to change the current (or default) printer initialization string for printing condensed (132 columns across) print. The right side of the screen displays an example of the format used to enter the codes. (For further information, see your Lotus user manual).

Drive Subdirectory Printer Return

To select Return, use the arrow keys to move the cursor to the word Return and press Return, or press the letter R only.

Use this command to return to the Main Menu.

I. * QUIT *

General Times Print Files Cycle-graph View-Stats Default Quit Exit worksheet

To select quit, use the arrow keys to move the cursor to the word Quit and press Enter, or press the Q key only. A secondary Menu will display and three additional commands become available:

Save Quit Return

Save first, then Quit

To select Save, use the arrow keys to move the cursor to the word Save and press Enter, or press the S key only.

The Time Study must be saved to disk or all editing changes will be lost. If Save was not selected from the Main Menu, this choice provides a last opportunity to store the Time Study analysis on the disk drive before leaving the program.

Save Quit Return—Quit without save

To select Quit, use the arrow keys to move the cursor to the word Quit and press Return, or just press the Q key.

Use this choice to leave the program without saving the Time Study. This choice would be valid if the Time Study was already saved, or if you wish to throw away your edits to the Time Study.

Save Quit Return—Return to the previous Menu To select Return, use the arrow keys to move the cursor to the word Return and press Enter, or press the R key only.

Use this choice to return to the Main Menu.

The manner in which the computer assisted time study system is implemented in the device 10 and a personal computer, as described, is set forth in the flow charts shown in FIGS. 9–22. It is believed the flow charts are self-explanatory.

From the foregoing description it will be apparent that the computer assisted time study system and the components thereof of the present invention have a number advantages, some of which have been described above and others of which are inherent in the invention.

In this respect, listed below are the salient features and advantages of the computer assisted time study system of the present invention:

1. The stop-watch-in-board concept provides a complete, ergonomic time study unit.

2. Minimum training time is required to learn how to use the computer assisted time study system.

3. Function keys and switches are titled in easy to read, full words.

4. There are no letters or codes to memorize, thereby eliminating confusion.

5. Internal sequencing and stop-watch-in-board coupled with the time study sheets (using a custom format) provide a clear road map for making professional time studies.

6. The special computer assisted time study system sheets minimize clerical entries before, during and after the study.

7. Several override options allow the analyst to record foreign or non-cyclical elements.

8. The analyst can choose individual element or global performance rating, and many other options during the study.

9. Time studies can be completed in decimal minutes to 3 places; or in decimal hours to 5 decimal places (same as MTM-TMU times).

10. When fully charged, data accumulating unit 10 can be operated for over 100 hours.

11. The 26 character LCD display provides the analyst with a complete real-time status of the study.

12. The "Battery Status" display indicates hours remaining before recharging is needed.

13. The "Memory Used" display alerts the analyst so that the computer assisted time study system's memory bank can be cleared before it is overloaded.

14. The large memory holds 2,000 elements/60,000 characters.

15. The computer assisted time study system software runs on any IBM compatible PC using Lotus 1-2-3 and DOS.

16. The computer assisted time study system software provides for completed professional time studies.

17. The software automatically computes "Labor Standards" and "Piece Rates."

18. Time study calculations can be modified within the provided system software or within the Lotus 1-2-3 program for specific customer needs.

19. Provision is made to preserve the original time studies without any modifications in their basic form. This is especially important in the event proof-of-study details are needed.

20. The computer assisted time study system provides ease of use and quick generation of labor standards.

21. The majority of the TSA (time study analyst) time and effort can be devoted to studying and analyzing the work.

22. The manual entries to the time study sheet during the study are minimized.

23. The clerical calculations previously so tedious are now done by the computer in a fraction of the time required for manual calculations.

24. The calculations include individual element times, performance rating, mean and median time values, histograms, labor standards, piece rates and more.

25. The override and overwrite operations allow for quick changes and adjustments during or after the study. Different allowance structures, additional elements or information, frequency changes, what-if method scenarios, are typical of the flexibility of the system.

26. The time studies can be stored as printed sheets or electronically on hard or floppy disks.

Accordingly, the scope of the invention is only to be limited as necessitated by the accompanying claims.

I claim:

1. A computer assisted time study system for establishing standard time values for operators or workers at a company, said system comprising:

a hand holdable data accumulating device including a hand holdable housing, electronic circuitry including a microcomputer in said hand holdable housing, transmitting means coupled to said microcomputer, on-board memory means associated with said microcomputer, and calculating means associated with said microcomputer for calculating output data in one of decimal minutes or decimal hours, a hand holdable clipboard mounted on top of said hand holdable housing and having means for releasably securing a time study sheet or form on said clipboard, a time study sheet or form having information regarding the data to be taken in a particular time study and for use in recording particulars of that time study, said sheet or form being mounted on said clipboard, and input means including switches on said clipboard of said hand holdable housing and switches on a side of said housing under a side margin of said clipboard for inputting, into said on-board memory means, data acquired by a time study analyst;

data acquisition software and initial processing software stored in said memory means of said microcomputer;

a personal or host computer including a memory and receiving means which can be periodically coupled to said transmitting means of said hand holdable data accumulating device for receiving said output data from said hand holdable data accumulating device into said memory of said personal or host computer and for having entered therein from said sheet or form, the particulars of the one or more time studies taken;

data processing software stored in said memory of said personal or host computer for further processing the output data received from said hand holdable data accumulating device; and, printing means for printing said output data after the output data has been further processed by said data processing software in one of decimal minutes or decimal hours, whichever is provided for by the data processing software.

2. The data accumulating device of claim 1 wherein said input means comprises manually actuated push button/keys for identifying elements for making a time study which are mounted on said hand holdable clipboard and manually actuated switches which are mounted on a side wall of said hand holdable housing, said data accumulating device further includes a visual display on said clipboard for indicating the number corresponding to the push button/key actuated, the status of a battery and the status of said memory means including the amount of unused memory left in said memory means at any point in time, said electronic circuitry including timer circuitry, said input means further comprises a manually operated control button/key for initiating the operation of said timer circuitry, and, a manually operated control button/key for stopping the operation of the timer circuitry, and, said calculating means is responsive to manual manipulation of said button/keys of said device for producing on said visual display an indication of a relationship between a previously entered standard time identification and a later entered actual time identification in decimal minutes or decimal hours.

3. A hand holdable data accumulating device which is adapted for use in a computer assisted time study system for establishing standard time values for workers or operators at a company and which comprises: a hand holdable housing, electronic circuitry including a microcomputer in said hand holdable housing and a hand holdable clipboard mounted on top of said hand holdable housing for releaeably receiving and holding a time study sheet or form having information regarding the data to be taken in a particular time study and for use in recording particulars of that time study, said microcomputer including on-board memory means having data acquisition software and initial processing software stored in said memory means, input means on said data accumulating device for inputting, into said on-board memory means data, acquired by a time study analyst and entered on said time study sheet, and said electronic circuitry further including calculating means for calculating output data in either of decimal minutes or decimal hours.

4. The data accumulating device of claim 3 wherein said input means comprises manually actuated push button/keys for identifying elements for making a time study which are mounted on said hand holdable clipboard and manually actuated switches which are mounted on a side wall of said hand holdable housing, said data accumulating device further comprises a visual display on said clipboard for indicating the number corresponding to the push button/key actuated, the status of a battery and the status of said memory means including the amount of unused memory left in said on-board memory means at any point in time, said electronic circuitry further including timer circuitry, said input means further comprises a manually operated control button/key for initiating the operation of said timer circuitry, a manually operated control button/key for stopping the operation of the timer circuitry, and, said calculating means is responsive to manual manipulation of button/keys of said device for producing on said visual display an indication of a relationship between a previously entered standard time identification and a later entered actual time identification in decimal minutes or decimal hours.

5. The computer assisted time study system of claim 1 wherein said data processing software calculates output data in one of decimal minutes to three decimal places or decimal hours to five decimal places.

6. The computer assisted time study system of claim 1 wherein said calculating circuit means calculates output data in one of decimal minutes to three decimal places or decimal hours to five decimal places.

7. The data accumulating device of claim 4 wherein said calculating means calculates output data in one of decimal minutes to three decimal places or decimal hours to five decimal places.

8. The computer assisted time study system of claim 1 wherein said switches of said input means include: a READ switch; a TIME OUT switch; an ON/OFF switch; a TRANSMIT switch; and, an ERASE switch.

9. The computer assisted time study system of claim 1 wherein said switches are toggle switches and said edge of said clipboard above said plurality of switches is substantially transparent.

10. The computer assisted time study system of claim 1 wherein said data accumulation device has on a top surface of said clipboard a keypad including number keys 0–9 and a * key and a # key for CLEAR and ENTER defining at least part of said input means.

11. The computer assisted time study system of claim 1 wherein said data accumulation device has on a top surface of said clipboard a plurality of push button switches defining at least part of said input means.

12. The computer assisted time study system of claim 11 wherein said plurality of push button switches include: a STUDY switch; a CYCLE switch; an ELEMENT switch; and a RATING switch.

13. The computer assisted time study system of claim 12 including a visual display divided into spaces for displaying, beneath said push button switches: STUDY, CYCLE, ELEMENT and RATING.

14. The computer assisted time study system of claim 1 including a visual display divided into spaces for displaying, MEMORY status, BATTERY STATUS, TIME OUT, i.e., if the device has been activated to recognize a "time out" and TOTAL TIME PER STUDY.

15. The data accumulation device of claim 3 wherein said switches on said side of said housing are located under an edge of said clipboard.

16. The data accumulation device of claim 15 wherein said plurality of switches include: a READ switch; a TIME OUT switch; an ON/OFF switch; a TRANSMIT switch; and an ERASE switch.

17. The data accumulation device of claim 15 wherein said switches are toggle switches and said edge of said clipboard above said plurality of switches is substantially transparent.

18. The data accumulation device of claim 3 including, on a top surface of said clipboard, a keypad including number keys 0–9 and a * key and a # key for CLEAR and ENTER defining at least of said input means.

19. The data accumulation device of claim 3 including, on a top surface of said clipboard, a plurality of push button switches defining at least part of said input means.

20. The data accumulation device of claim 19 wherein said plurality of push button switches include: a STUDY switch; a CYCLE switch; an ELEMENT switch; and, a RATING switch.

21. The data accumulation device of claim 20 including a visual display divided into spaces for displaying, beneath said push button switches, STUDY, CYCLE, ELEMENT and RATING.

22. The data accumulation device of claim 3 including a visual display divided into spaces for displaying MEMORY status, BATTERY STATUS, TIME OUT, i.e., if the device has been activated to recognize a "time out" and TOTAL TIME PER STUDY.

* * * * *